United States Patent
Umeda et al.

(10) Patent No.: US 7,253,917 B2
(45) Date of Patent: Aug. 7, 2007

(54) IMAGE PROCESSING APPARATUS AND ITS CONTROL METHOD, COMPUTER PROGRAM, AND STORAGE MEDIUM

(75) Inventors: Kiyoshi Umeda, Kanagawa (JP); Nobutaka Miyake, Kanagawa (JP); Minoru Kusakabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1028 days.

(21) Appl. No.: 10/163,616

(22) Filed: Jun. 7, 2002

(65) Prior Publication Data

US 2002/0191216 A1 Dec. 19, 2002

(30) Foreign Application Priority Data

Jun. 11, 2001 (JP) ............................. 2001-175862
Sep. 28, 2001 (JP) ............................. 2001-301219

(51) Int. Cl.
*B41J 1/00* (2006.01)
*G06F 15/00* (2006.01)

(52) U.S. Cl. .................. 358/1.15; 358/3.28; 358/1.18; 358/5.05; 382/100; 382/140; 382/175; 370/529

(58) Field of Classification Search ............... 358/1.15, 358/1.14, 3.28, 1.18, 5.05, 425, 464; 382/100, 382/140, 175, 197, 318, 181–231, 232–253; 347/67; 370/529; 283/113; 713/176

See application file for complete search history.

(56) References Cited

U.S. PATENT DOCUMENTS

| 5,652,626 A | 7/1997 | Kawakami et al. | 348/463 |
| 5,675,331 A * | 10/1997 | Watanabe et al. | 341/67 |
| 6,341,350 B1 * | 1/2002 | Miyahara et al. | 713/176 |
| 6,813,385 B2 * | 11/2004 | Ideyama | 382/232 |
| 6,983,057 B1 * | 1/2006 | Ho et al. | 382/100 |

FOREIGN PATENT DOCUMENTS

| EP | 1 102 474 A2 | 5/2001 |
| JP | 2000-348040 | 12/2000 |
| JP | 2001-148778 | 5/2001 |
| JP | 2001-148779 | 5/2001 |

* cited by examiner

*Primary Examiner*—Aung S. Moe
*Assistant Examiner*—Scott Schlack
(74) *Attorney, Agent, or Firm*—Fitzpatrick, Cella, Harper & Scinto

(57) ABSTRACT

With this invention, upon scanning a print, since additional information recorded together with that print is reproduced while displaying the scanned image, a special effect that cannot normally be obtained from still images can be obtained.

A print on which image information and additional information, different from the image information, are printed is scanned by a scanner (209). An additional information demultiplexer (210) demultiplexes that additional information, which is decoded by an error correction decoder (211). After that, the image and the decoded additional information (moving image or/and acoustic information) are simultaneously reproduced in combination.

12 Claims, 38 Drawing Sheets

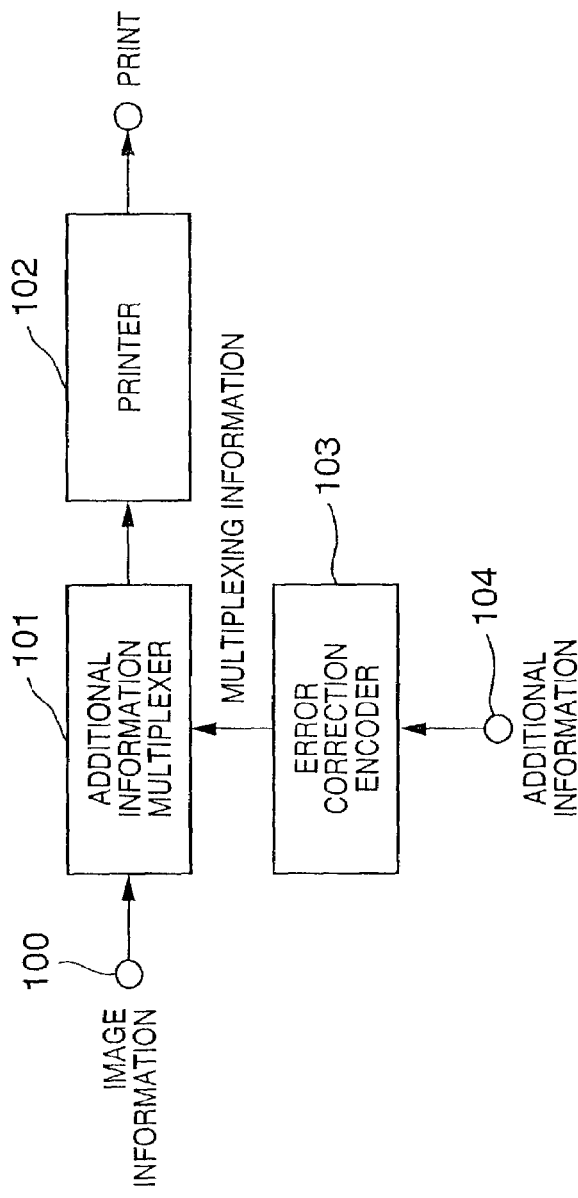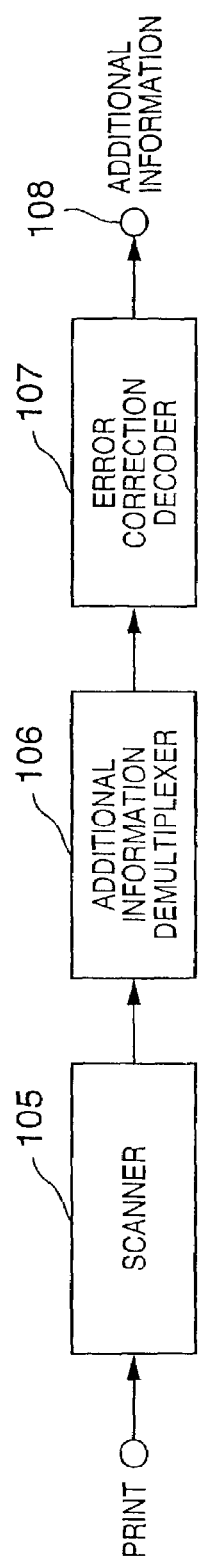

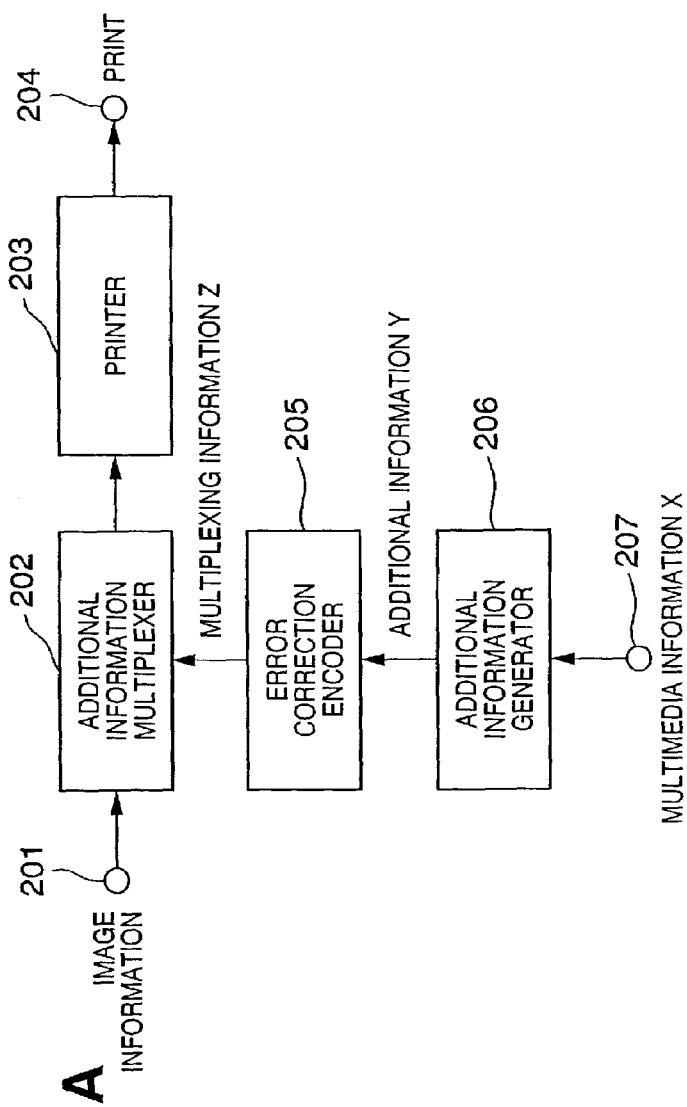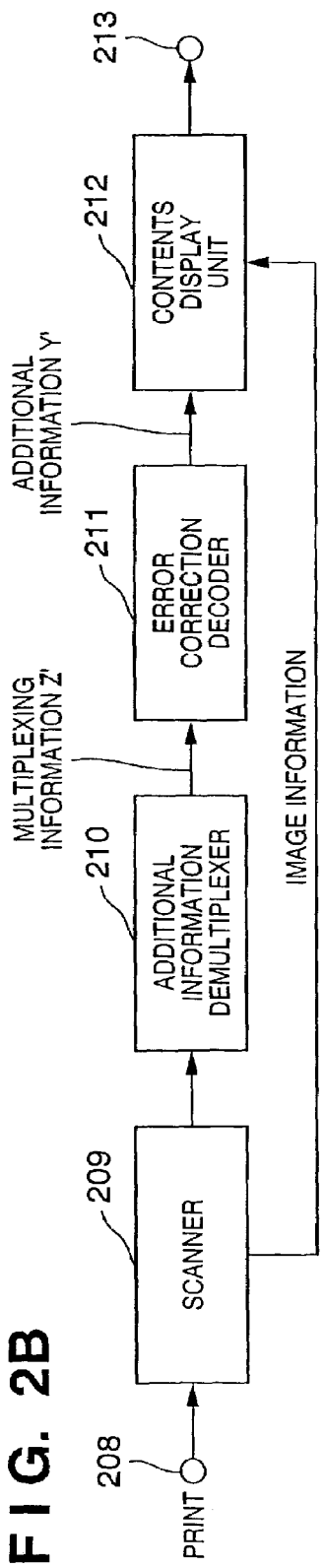

FIG. 22

TEXT DATA MULTIPLEXING

IMAGE:

PRINT INFORMATION:

PRINTER NAME: C-B○○○
RESOLUTION: 600dpi
PAPER: PHOTO QUALITY PAPER
MODE: BEST IMAGE QUALITY
RANGE: 100mm × 150mm
LEXING RATIO: 101%

ALARM
MULTIPLEXING RATIO HAS EXCEEDED 100%.
ENLARGE PRINT RANGE OR REDUCE DOCUMENT SIZE
[OK]

2071

[PRINT]

DISPLAY METHOD:
● SCROLL FROM BOTTOM
○ SCROLL FROM TOP
○ SLIDE-IN FROM BOTTOM
○ SLIDE-IN FROM TOP
○ SLIDE-IN FROM LEFT
○ SLIDE-IN FROM RIGHT
○ FADE-IN

EDIT AREA:
We're pretty good, and having wonderful days in our new house. Now, we have a big garden in our house, so we're planning to have a dog!!
........................
We're really looking forward to seeing you. Let us know when you

FIG. 24

| DISPLAY METHOD NUMBER | DISPLAY METHOD |
|---|---|
| 0x01 | SCROLL FROM BOTTOM |
| 0x02 | SCROLL FROM TOP |
| 0x03 | SLIDE-IN FROM TOP |
| 0x04 | SLIDE-IN FROM BOTTOM |
| 0x05 | SLIDE-IN FROM LEFT |
| 0x06 | SLIDE-IN FROM RIGHT |
| 0x07 | FADE-IN |

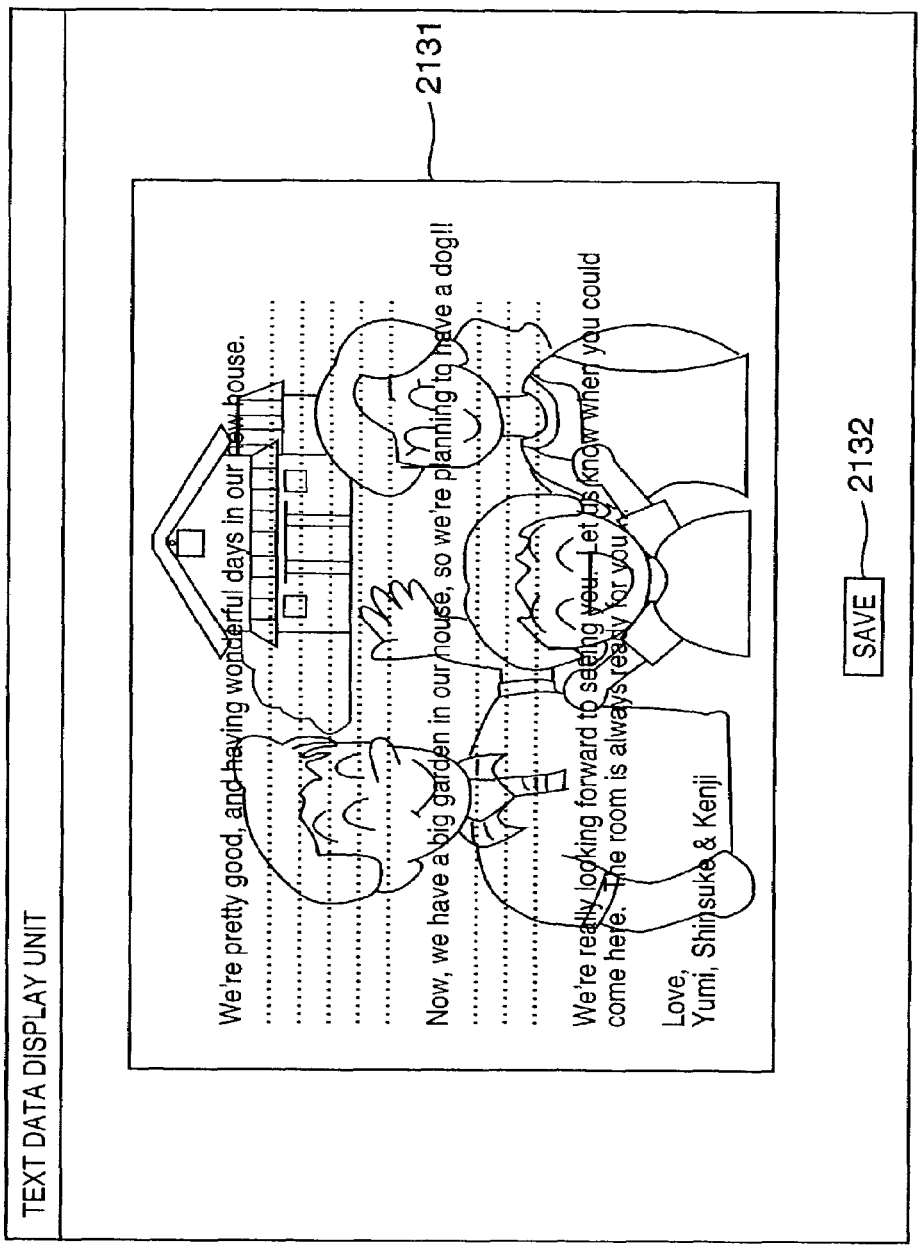

FIG. 29

TEXT DATA MULTIPLEXING — 2141

IMAGE:

PRINT INFORMATION:

| | |
|---|---|
| PRINTER NAME: | C-B○○○ |
| RESOLUTION: | 600dpi |
| PAPER: | PHOTO QUALITY PAPER |
| MODE: | BEST IMAGE QUALITY |
| PRINT RANGE: | 100mm×150mm |
| MULTIPLEXING RATIO: | 34% |

[PRINT]

EDIT AREA: — 2142

Dear Mom & Dad

Hi! How you guys doing?
We're pretty good, and having wonderful days in our new house.
Now, we have a big garden in our house, so we're planning
to have a dog!!
.................
We're really looking forward to seeing you. Let us know when you

DISPLAY METHOD:
- ● SCROLL FROM BOTTOM
- ○ SCROLL FROM TOP
- ○ SLIDE-IN FROM TOP
- ○ SLIDE-IN FROM BOTTOM
- ○ SLIDE-IN FROM LEFT
- ○ SLIDE-IN FROM RIGHT
- ○ FADE-IN

SPEAKER INFORMATION: MALE ADULT

FIG. 30

| AGE GROUP | GENDER | |
|---|---|---|
| | MALE | FEMALE |
| CHILD | 0x01 | 0x02 |
| ADULT | 0x03 | 0x04 |
| AGED | 0x05 | 0x06 |

FIG. 38

| DECODING RESULT |
|---|

Dear Mom & Dad

Hi! How you guys doing?
We're pretty good, and having wonderful days in our new house.
..............

Now, we have a big garden in our house, so we're planning to have a dog!!
..............

We're really looking forward to seeing you. Let us know when you could come here. The room is always ready for you....

Love,
Yumi, Shinsuke & Kenji

IMAGE PROCESSING APPARATUS AND ITS CONTROL METHOD, COMPUTER PROGRAM, AND STORAGE MEDIUM

FIELD OF THE INVENTION

The present invention relates to an image processing apparatus and its control method, a computer program, and a storage medium.

BACKGROUND OF THE INVENTION

Conventionally, a method of recording an image and arbitrary additional information on a print medium such as a single sheet surface or the like has been proposed. For example, according to Japanese Patent Laid-Open No. 2000-348040, additional information is converted into a two-dimensional dot code, which is printed on the same sheet surface as the image. FIG. 37 is a view for explaining an image and additional information, which are printed on a sheet surface using the prior art. In FIG. 37, an image 3701 and two-dimensional dot code 3702 are printed on a single sheet surface 3703. Conventionally, a region of the two-dimensional dot code 3702 is scanned by an optical scanner such as an image scanner or the like to restore original additional information.

With this method, audio information, large-size text information, and the like, which cannot be conventionally transmitted by only a sheet surface, can be transmitted via a print medium, i.e., the sheet surface.

However, the above prior art suffers the following problems. In the conventional method, additional information must be restored by analyzing an image dot pattern obtained by reading only the region of the two-dimensional dot code 3702 in FIG. 37 using the optical scanner such as an image scanner or the like. For example, if the restored additional information is text data, the restored text data alone is displayed by a display method shown in FIG. 38. FIG. 38 shows an example of a display method of text data or the like restored using the prior art.

For example, assume that information contained in the two-dimensional dot code 3702 in FIG. 37 is closely related to the image 3701, i.e., it is a greeting message from a person who appears in the image 3701, or is a detailed comment for a product as an object. At this time, if text data alone is displayed, as shown in FIG. 38, the user who observed that data cannot feel sense of identity between the image and additional information.

In the above example, the two-dimensional dot code 3702 is printed on a region different from the image. Also, a technique for embedding additional information in an image is known. Such technique is generally called digital watermarking, and is standardized. With this technique, additional information of an author name, license, or the like is multiplexed on image information of a photo, picture, or the like to be visibly unrecognizable, and such information is distributed via a network such as the Internet or the like.

As another application field, in order to prevent paper money, stamps, securities, and the like from being counterfeited with the advent of high-quality image output apparatuses such as copying machines, printers, and the like, a technique for embedding additional information in an image to specify an output apparatus and its model number from an image output on a paper sheet is known.

For example, U.S. Pat. No. 5,652,626 has proposed a technique for multiplexing information by embedding additional information in a high-frequency range of color difference and saturation components with low visibility.

The assignee of the present applicant has already proposed a method of embedding many codes of additional information by artificially generating combinations of quantization values which cannot be generated by normal pseudo halftoning, and generating regularity in texture produced by error diffusion upon executing the pseudo halftoning based on error diffusion. With this method, since the texture pattern slightly changes microscopically, nearly no deterioration of image quality is observed. If a method of changing a quantization threshold value of error diffusion is used, since the density value of dot area modulation can be visibly preserved, different types of signals can be easily multiplexed.

FIGS. 1A and 1B are block diagrams showing the arrangement of an image processing system proposed by the present applicant. In FIGS. 1A and 1B, reference numerals 100 and 104 denote input terminals. Multi-tone image information is input from the input terminal 100, and additional information to be embedded in the image information is input from the input terminal 104. As the additional information, various kinds of information different from the image information may be used. The additional information undergoes an encoding process for error correction by an error correction encoder 103. As the error correction code, various kinds of codes such as a BCH code, Reed-Solomon code, and the like may be used. Multiplex information obtained as a result of error correction encoding is input to an additional information multiplexer 101. This additional information multiplexer 101 is a device for visibly unrecognizably embedding additional information in image information. The additional information multiplexer multiplexes the additional information, and also quantizes the input multi-tone image information. Reference numeral 102 denotes a printer which outputs information generated by the additional information multiplexer via a printer engine. As the printer, a printer which implements tone expression using pseudo halftoning such as an ink-jet printer, laser printer, or the like may be used.

Information on an output print is scanned using a scanner 105, and an additional information demultiplexer 106 analyzes the regularity of texture generated in the print process, thereby demultiplexing the additional information embedded in the print. The demultiplexed additional information undergoes an error correction decoding process by an error correction decoder 107, and is then output from an output terminal 108.

With the aforementioned method, large-size information can be surely multiplexed in image information without deteriorating the quality of that image information.

However, an image region printed on a sheet is merely considered as a recording medium, and has the same purpose as recording media such as a floppy disk, CD-ROM, and the like. That is, the added information itself is handled as sole information, and generates no new effect in combination with an image which serves as an information multiplexing region.

SUMMARY OF THE INVENTION

The present invention has been made in consideration of the aforementioned problems, and has as its object to provide an image processing apparatus, which can produce a special effect not normally obtainable from still images by displaying an image scanned from a print, and reproducing additional information recorded on that print.

According to the present invention, the foregoing object is attained by an image processing apparatus for scanning a print on which image information and additional information, different from the image information, are printed, and displaying the image information and additional information, comprising: demultiplexing means for demultiplexing the additional information in image information obtained by scanning; and reproduction means for reproducing the additional information demultiplexed by the demultiplexing means in combination with the scanned image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1A and 1B are block diagrams showing the arrangement of a conventional digital watermarking system;

FIGS. 2A and 2B are functional block diagrams of the first embodiment;

FIG. 21 is a view for explaining an image region 2062 printed on a recording medium 2061 such as a sheet surface or the like;

FIG. 22 shows a GUI window when a multiplexing ratio R has exceeded 100%, and an alarm message 2071 is displayed;

FIG. 24 shows a list of display method numbers 2081e in the header field 2081;

FIG. 28 shows a GUI window when the window of text data shown in FIG. 27 has scrolled;

FIG. 29 shows a display example of a GUI window used in the text data edit unit in the third embodiment;

FIG. 30 shows a list of speaker information numbers of voice quality information defined in the fourth embodiment;

FIG. 38 shows an example of a display method of text data and the like restored using the prior art.

DETAILED DESCRIPTION OF THE PREFERRED EMBODIMENTS

First Embodiment

Preferred embodiments of the present invention will now be described in detail in accordance with the accompanying drawings.

Note that it is efficient to install an image processing apparatus of this embodiment as printer driver software or application software in a computer that generates image information to be output to a printer engine, but it is also effective to install the apparatus as hardware and software in a copying machine, facsimile apparatus, printer main body, and the like.

Figure 3:
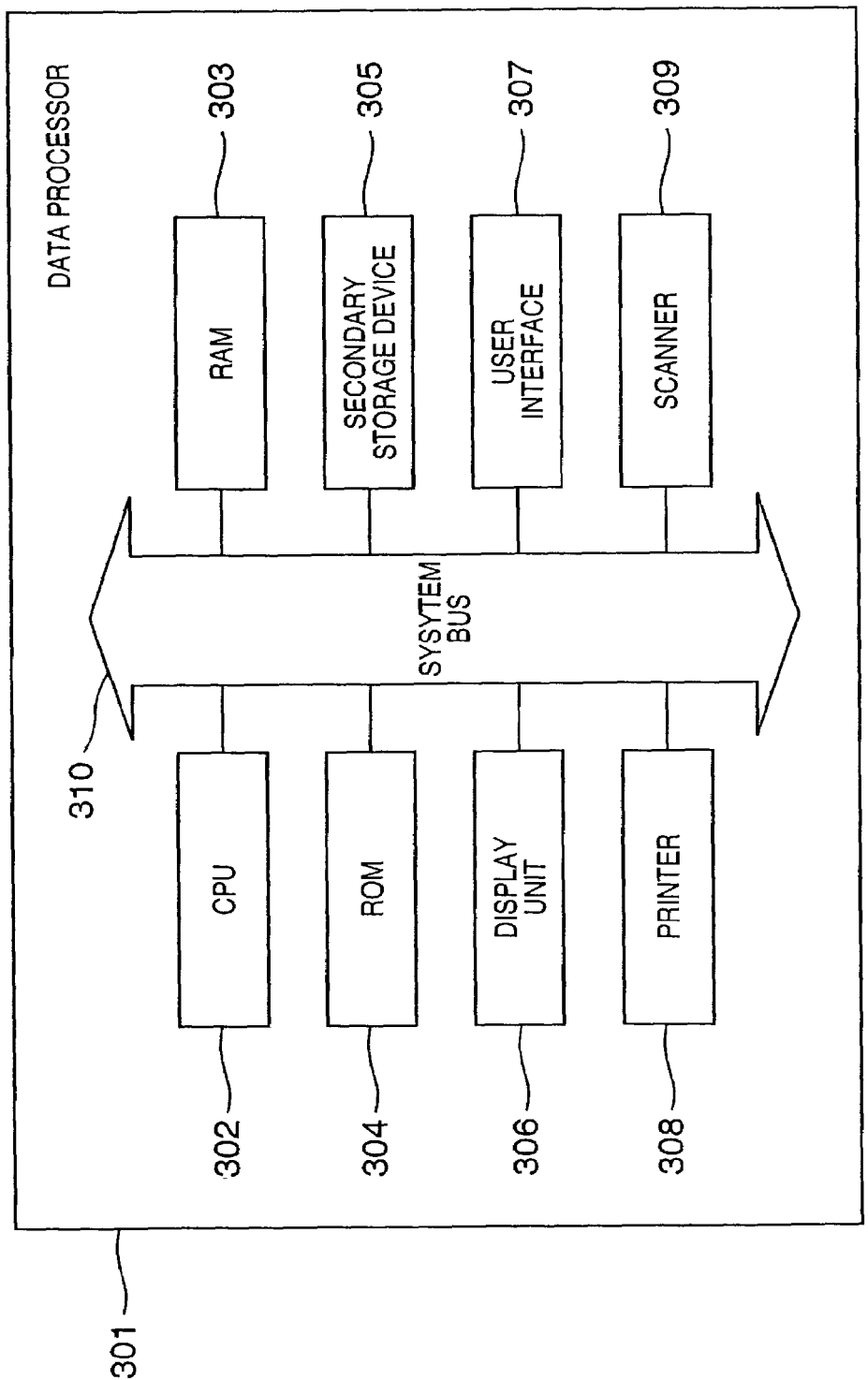
FIG. 3 is a block diagram of an apparatus in the first embodiment.

FIGS. 2A and 2B are functional block diagrams showing the arrangement of an image processing system of this embodiment, and FIG. 3 is a block diagram showing an example of the apparatus arrangement.

In an apparatus (data processor) 301 in FIG. 3, reference numeral 302 denotes a CPU for controlling the entire apparatus; 303, a RAM used as a work area of the CPU 302; and 304, a ROM which stores a BIOS and boot program.

Reference numeral 305 denotes a secondary storage device such as a hard disk device or the like which stores an OS and a program as means for implementing functions shown in FIG. 1. Reference numeral 306 denotes a display unit; and 307, a user interface that connects a mouse, keyboard, and the like. Reference numeral 308 denotes a printer; and 309, an image scanner. These building components are connected via a bus 310.

Referring to FIG. 2, reference numerals 201 and 207 denote input terminals. The input terminal 201 can be the scanner 309 or secondary storage device 305 that stores images as files, and the input terminal 207 can be the secondary storage device. In either case, the input terminal 201 inputs multi-tone image information, and the input terminal 207 inputs required multimedia information X to be embedded in the image information. As the multimedia information X, various kinds of information different from the image information input from the input terminal 201 may be used. In this embodiment, moving image information shown in FIG. 4 is used as the multimedia information X.

Figure 4:
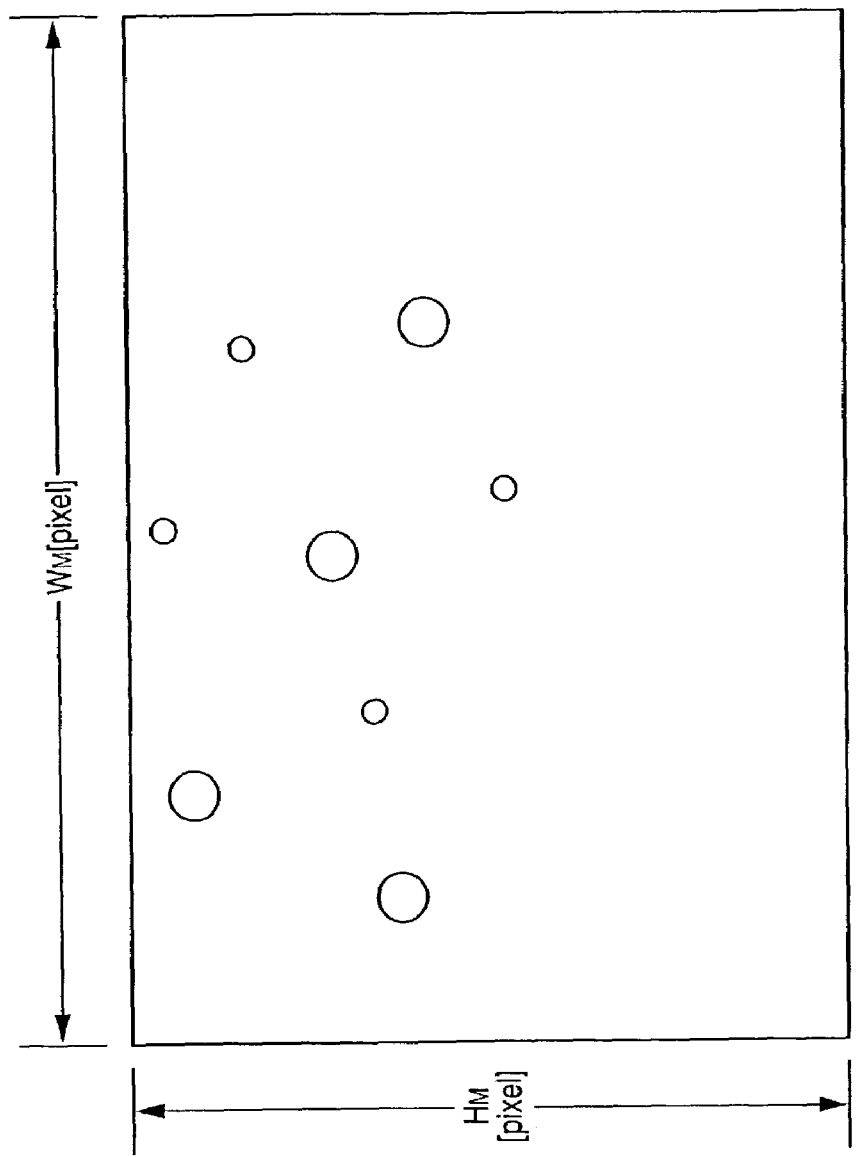
FIG. 4 shows an example of moving image information used in the first embodiment.
Figure 5:
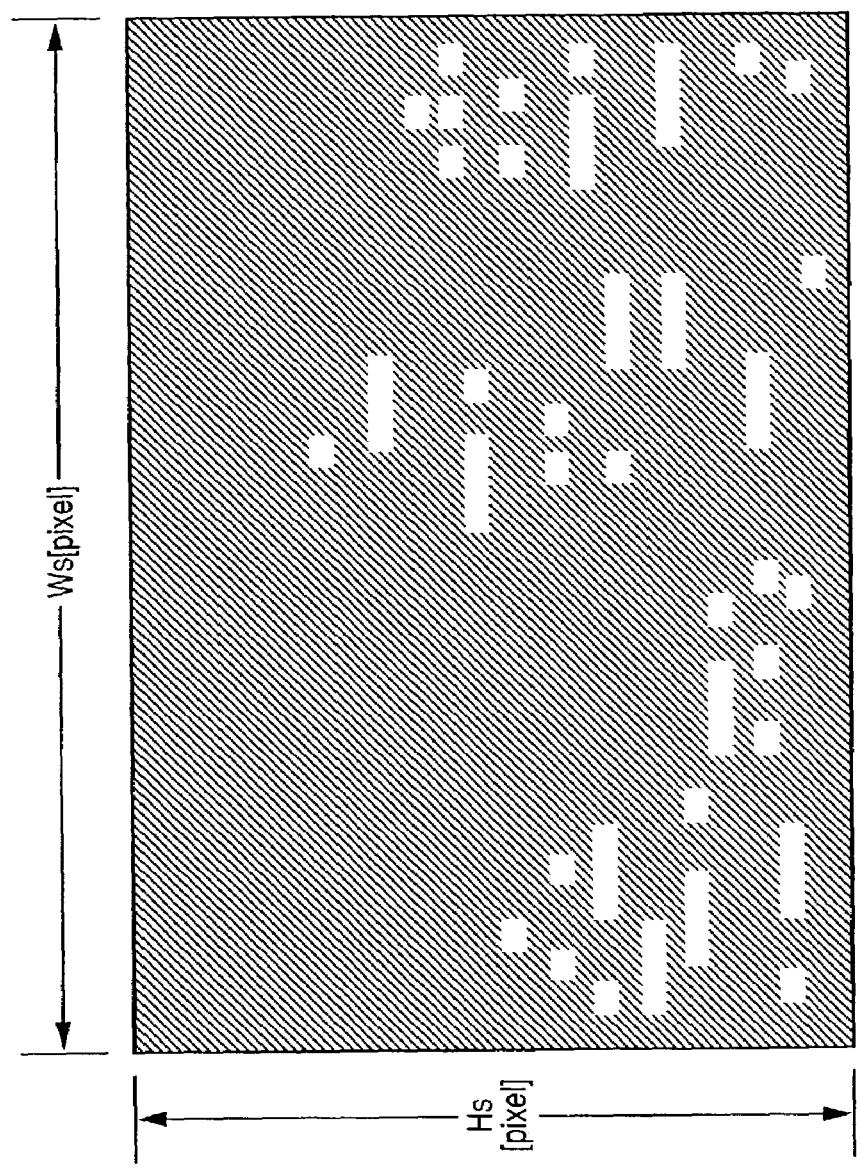
FIG. 5 shows an example of an image which is to undergo multiplexing in the first embodiment.

Note that FIG. 4 shows an animation of snowfall, which has a size of $H_M \times W_M$ pixels. As the data format, animation GIF which is used prevalently, a data format described in a vector description language, MPEG, and the like may be used, and any of these formats may be used in this embodiment. As an example of a multi-valued image input from the input terminal 201, a night scene image ($H_S \times W_S$ pixels) shown in FIG. 5 is used.

Figure 6:
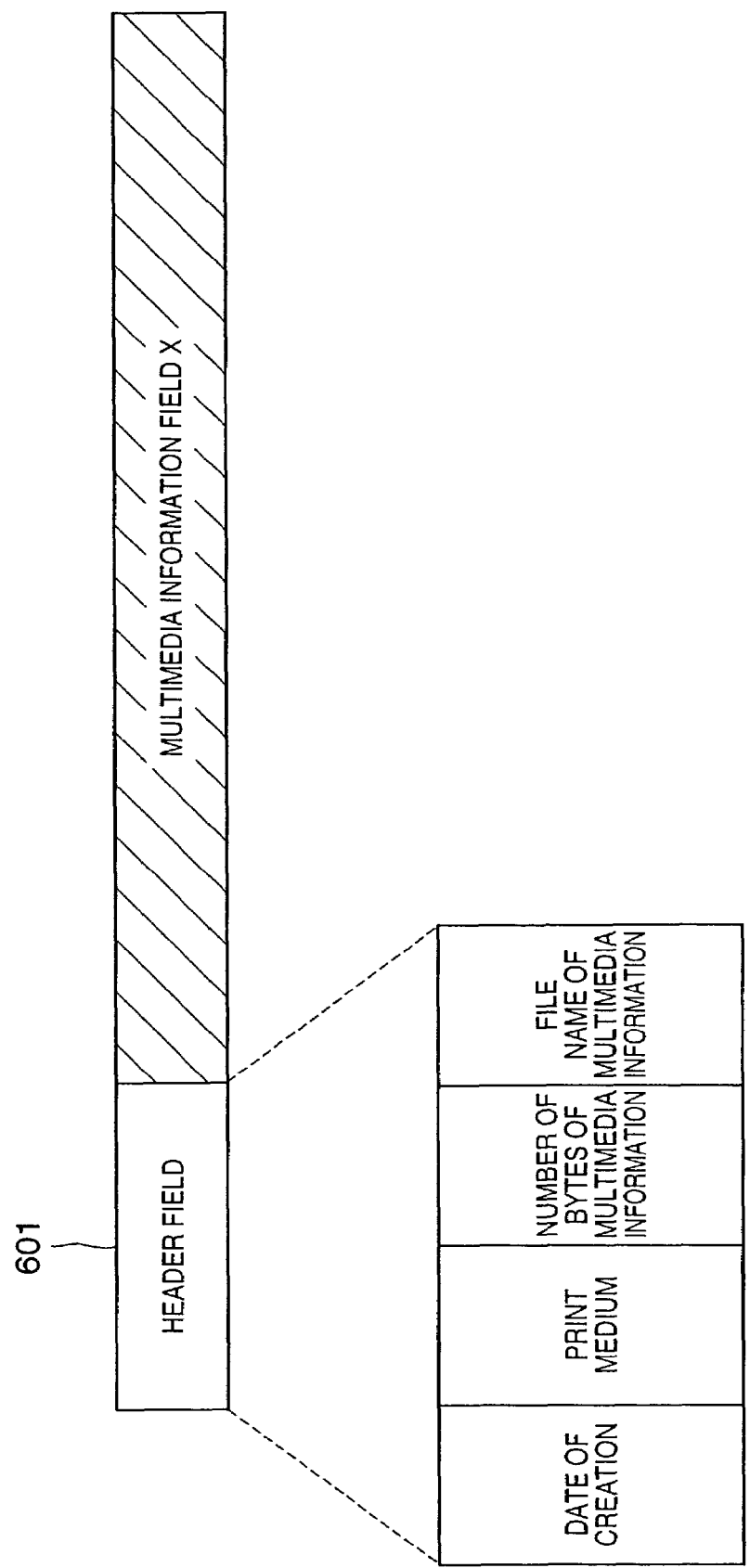
FIG. 6 shows a multiplexing format in the first embodiment.

An additional information generator 206 appends a header field for a multiplexing format to the multimedia information X, and outputs that information X as additional information Y. FIG. 6 shows an example of the format of the additional information Y. A header field 601 stores the date of creation of the additional information Y, the type of print medium, the number of bytes of multimedia information, a file name with an extension, and the like.

The additional information Y is then input to an error correction encoder 205, which appends an error correction code to the additional information Y, and consequently outputs multiplexing information Z. Various error correction codes have been proposed, and a Reed-Solomon code, BCH code, Fire code, Peterson code, and the like may be used. In this embodiment, any of these codes may be used as the error correction method.

An additional information multiplexer 202 in FIG. 2 visibly unrecognizably embeds the multiplexing information Z in image information. More specifically, upon executing pseudo halftoning based on error diffusion, combinations of quantization values which cannot be produced by normal pseudo halftoning are artificially generated to generate regularity in texture produced by error diffusion, thereby embedding a code. With this method, since the texture pattern slightly changes microscopically, nearly no deterioration of image quality is observed. If a method of changing a quantization threshold value of error diffusion is used, since the density value of dot area modulation can be visibly preserved, different types of signals can be easily multiplexed.

After multiplexing, the multiplexed information is printed out by a printer 203. To the user, this printout looks as if an image input from the input terminal 201 were printed. Note that a printer which implements tone expression using pseudo halftoning such as an ink-jet printer, laser printer, or the like can be used as the printer 203.

The operation contents on the information multiplexing apparatus have been explained.

The operation of an apparatus for restoring information embedded in a print will be explained below. The detailed arrangement of this apparatus is the same as that shown in FIG. 3.

Image information on an output print is scanned using an optical scanner 209 such as the scanner 309 or the like. The scan resolution must be equal to or higher than the print resolution. The scanned image information ($H'_S \times W'_S$ pixels) is input to an additional information demultiplexer 210, which analyzes the regularity of the texture generated in the print process, thereby demultiplexing multiplexing information Z' embedded in the print.

The demultiplexed multiplexing information Z' is input to an error correction decoder 211. The error correction decoder 211 executes an error correction process, and additional information Y' obtained as a result of that process is input to a contents display unit 212, which reproduces contents using appropriate means depending on the type of appended multimedia information.

Figure 7:
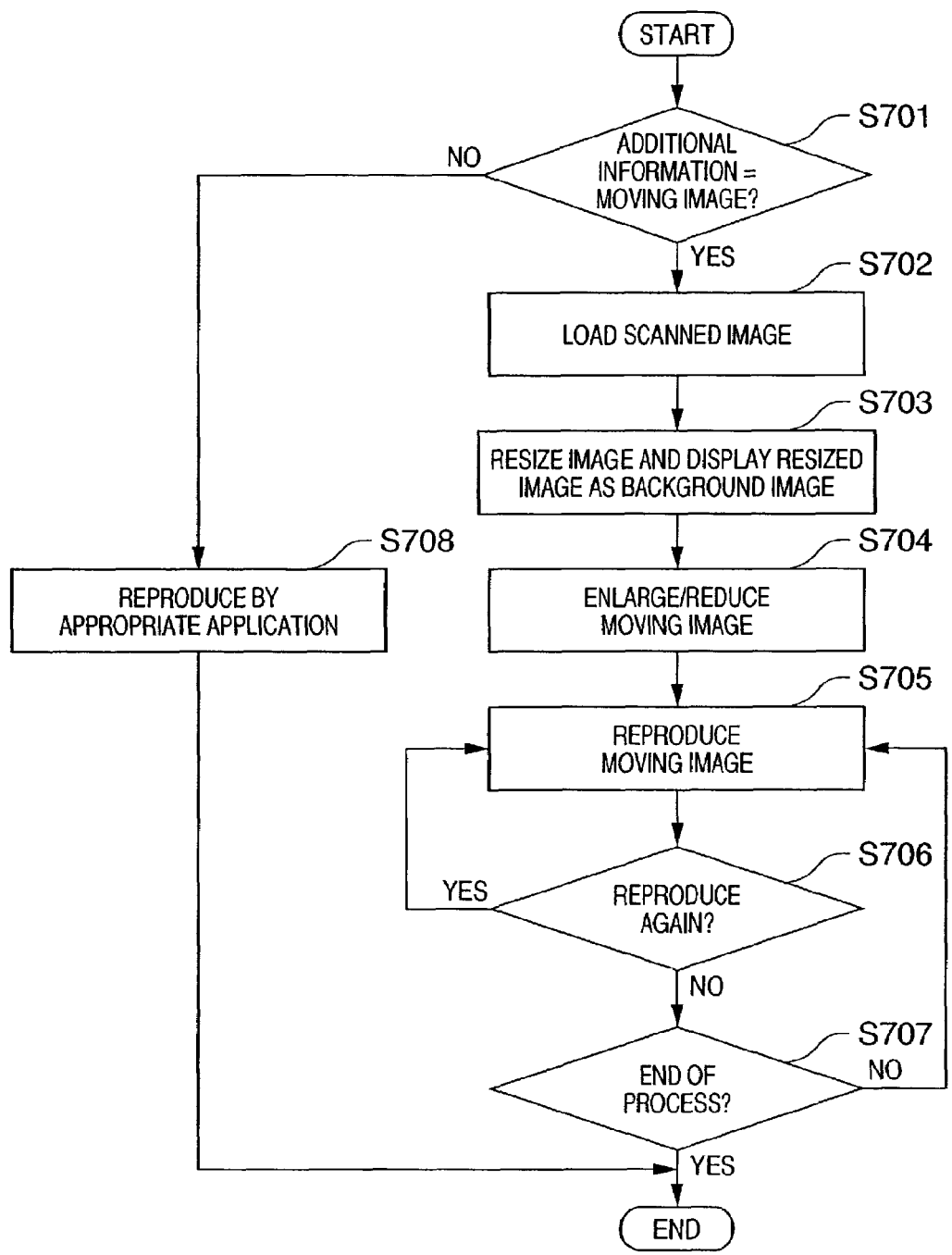
FIG. 7 is a flow chart showing the contents display processing sequence in the first embodiment.

FIG. 7 shows the flow of the process of the contents display unit 212 in this embodiment. The process of the contents display unit 212 will be described below with reference to FIG. 7.

Referring to FIG. 7, it is checked in step S701 if the demultiplexed multiplexing information Z' is a moving image. This checking process is implemented using the extension of the file name of the multimedia information contained in the header field of the additional information Y'. That is, if the file extension is "GIF", "MPG", or an extension indicating another moving image format, the flow advances to step S702; otherwise, the multimedia information is reproduced using an application corresponding to the extension in step S708. The image information ($H'_S \times W'_S$ pixels) scanned by the scanner 209 is loaded in step S702, and is resized to a display size of $H_D \times W_D$ pixels (FIG. 8) and is displayed on a viewer 801 for display as a background image in step S703. As the resize method, any of nearest neighbor interpolation, linear interpolation, and the like, which are known to those who are skilled in the art, can be used.

Figure 8:
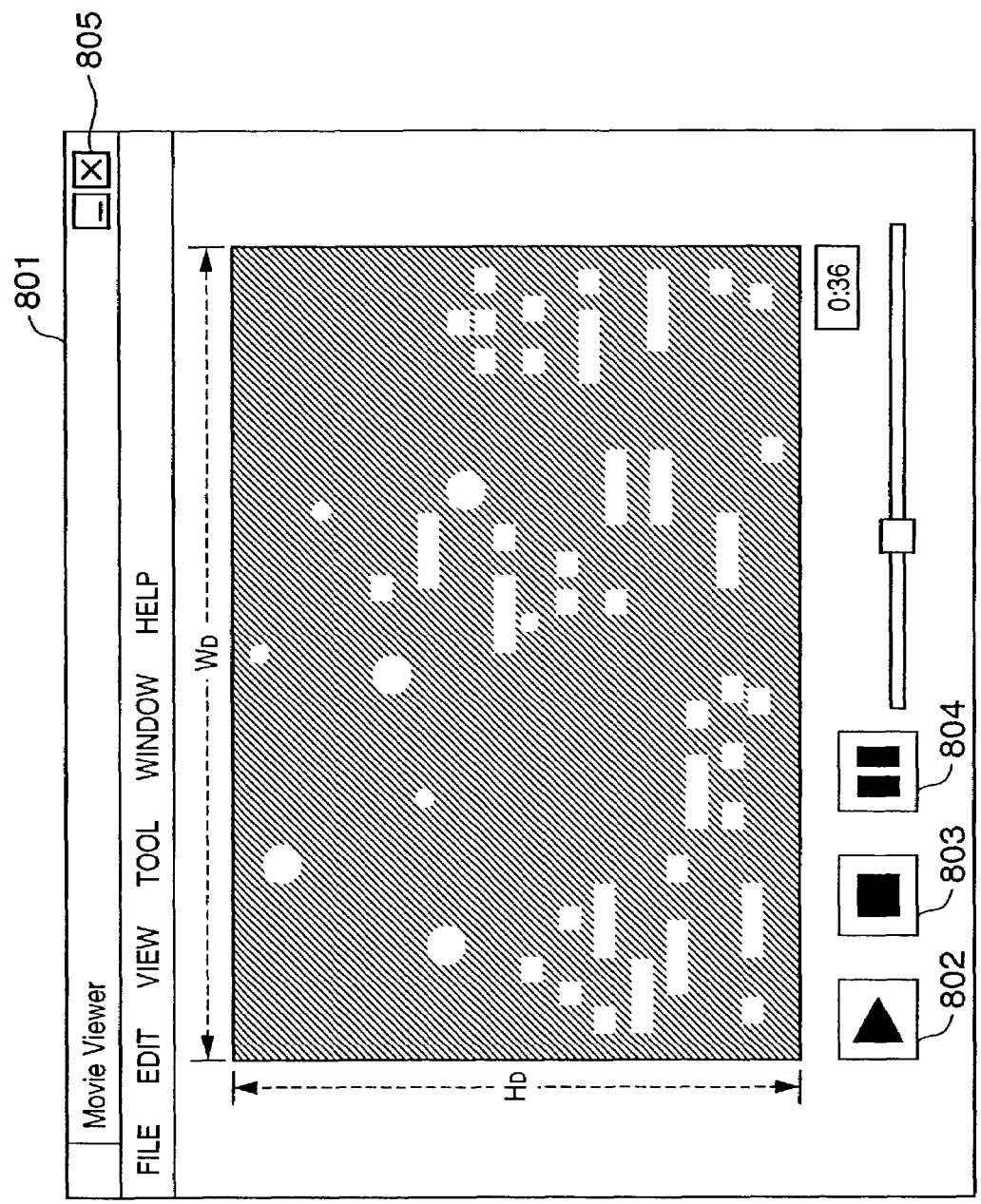
FIG. 8 shows a display example of a reproduction process in the first embodiment.

The decoded moving image information X is resized to a display size of $H_D \times W_D$ pixels in step S704, and is reproduced to be superposed on the background image in step S705. FIG. 8 shows an example of the moving image reproduction process, i.e., a state wherein snow is falling on the scanned night scene image. The user can control the moving image using a play button 802, pause button 804, stop button 803, process end button 805, and the like of the viewer 801. After completion of reproduction, if it is determined in step S706 that the play button has been pressed, the moving image reproduction process is executed again; if it is determined in step S707 that the process end button has been pressed, the processing ends.

The flow of the process in this embodiment has been explained. As has been described in this embodiment, by compositing an image scanned by the scanner and moving image information embedded in that image, entertaining print, restoration, and reproduction processes, which cannot be realized by the prior art, can be implemented. In this embodiment, only a piece of moving image information is selected as additional information. However, the number of pieces of moving image information is not limited to one. Also, moving image information and information different from moving image information such as audio information or the like may be multiplexed together in a print image region, and the audio information may be reproduced simultaneously with the moving image information. Such application is also included in the scope of the present invention.

Figure 9:
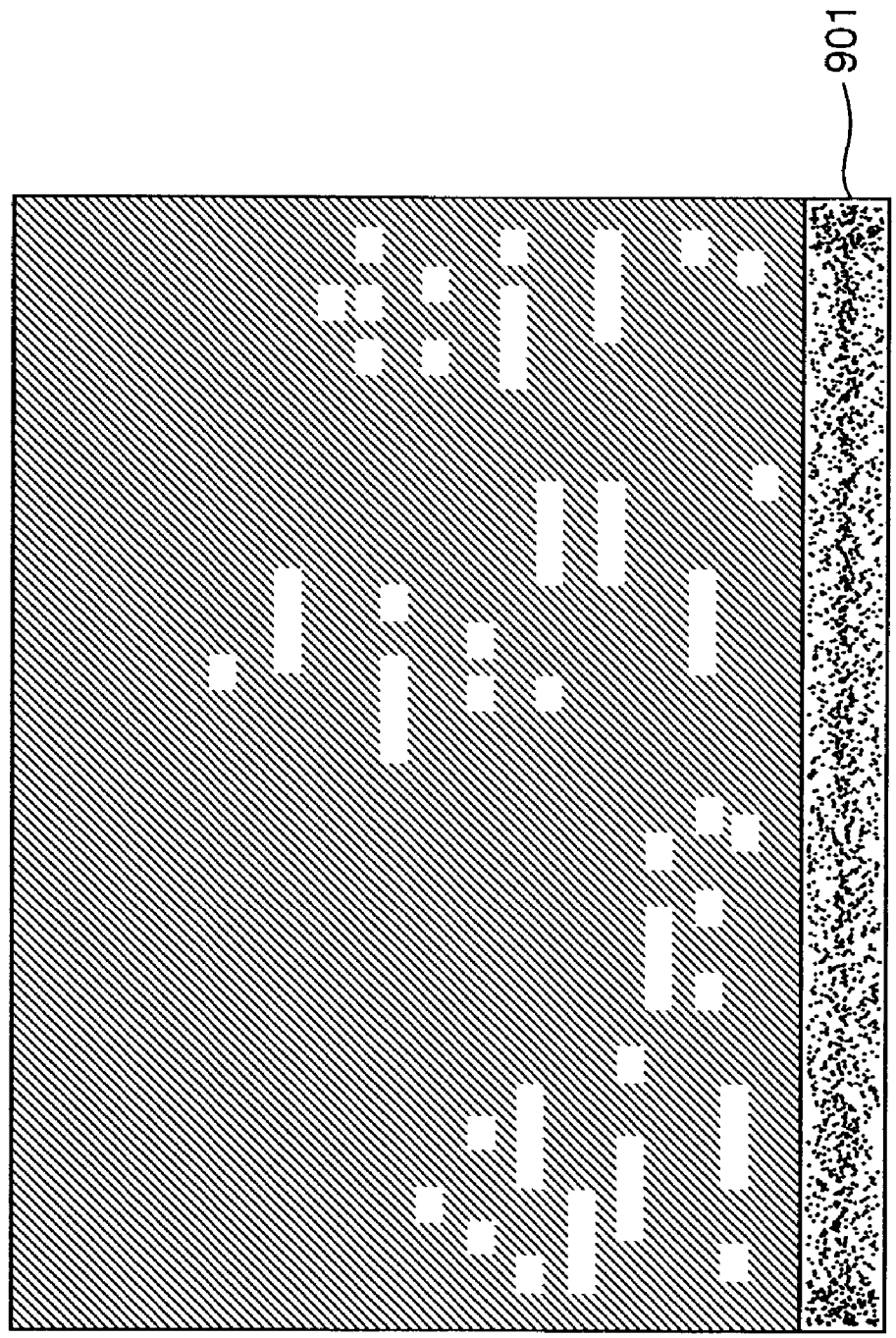
FIG. 9 shows an example of a print when moving image information is appended by a dot code.

This embodiment adopts a technique for invisibly embedding additional information in an image. Also, the same effect can be obtained by printing a two-dimensional dot code or bar code shown in FIG. 9. In FIG. 9, reference numeral 901 denotes a two-dimensional dot code region, where moving image information is printed as an ON/OFF pattern of dots. On the reproduction side, the moving image information is restored by scanning the region 901, and is composited with image information obtained by scanning an image region, thereby obtaining the same effect as that the present invention aims at. Of course, such case is included in the scope of the present invention.

When additional information does not change along with an elapse of time (e.g., text), composite reproduction may be inhibited. Such case can be determined based on the extension. That is, if information has an extension such as MPEG, WAV, or the like, it is at least information which changes along with an elapse of time, and composite reproduction is executed in such case, as described in the embodiment.

Second Embodiment

In the above embodiment (first embodiment), a moving image to be displayed is composited on the entire frame of the scanned image, as shown in FIG. 8. However, some users may want to composite and display a moving image with an arbitrary size at an arbitrary location. The second embodiment will explain an example which can implement such processes.

Figure 10:
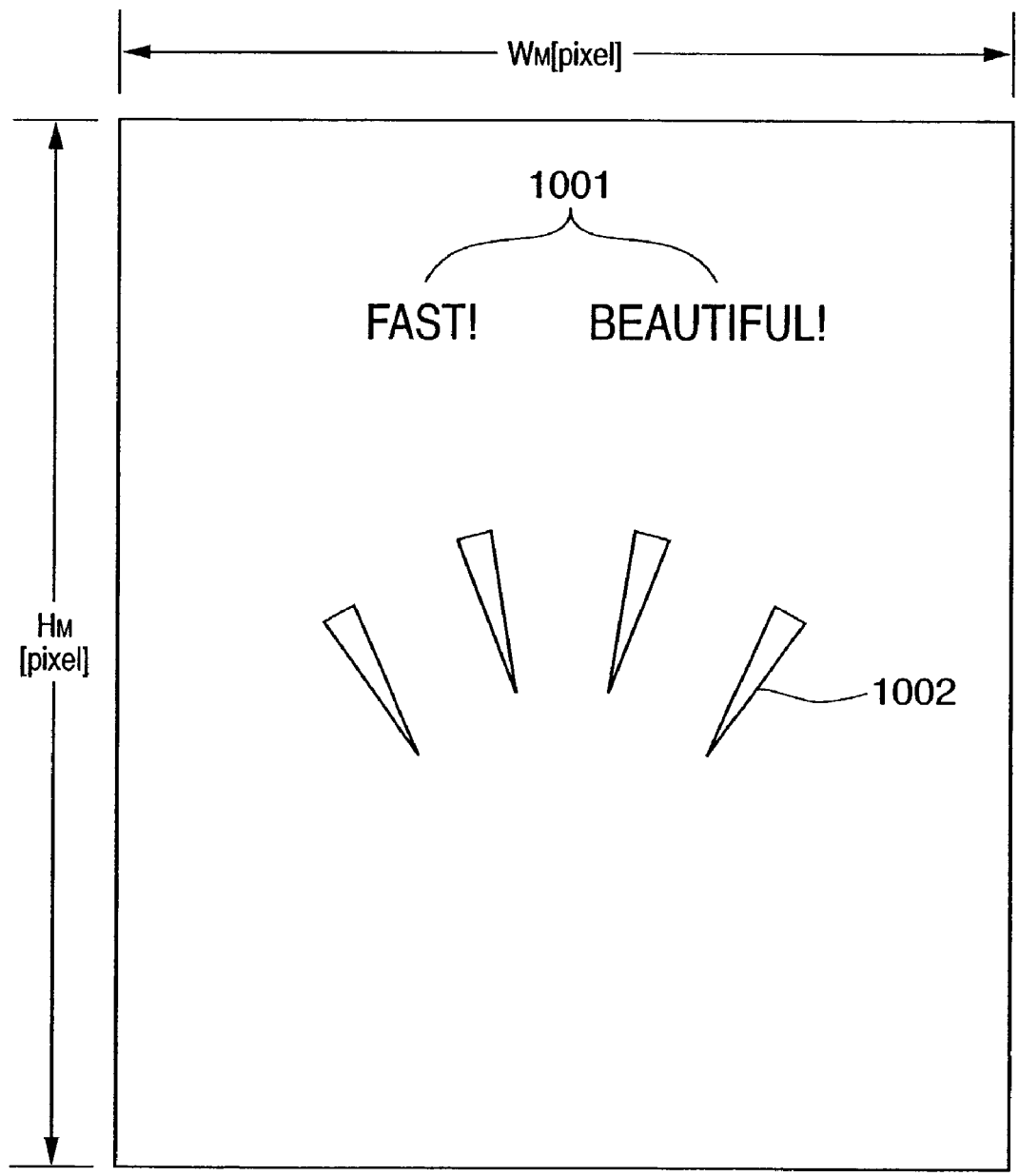
FIG. 10 shows moving image information in the second embodiment.

FIG. 10 shows moving image information used in this embodiment. The size of the moving image is $H_M \times W_M$ pixels, and this information is an animation of flickering text 1001 and a FIG. 1002.

Figure 11:
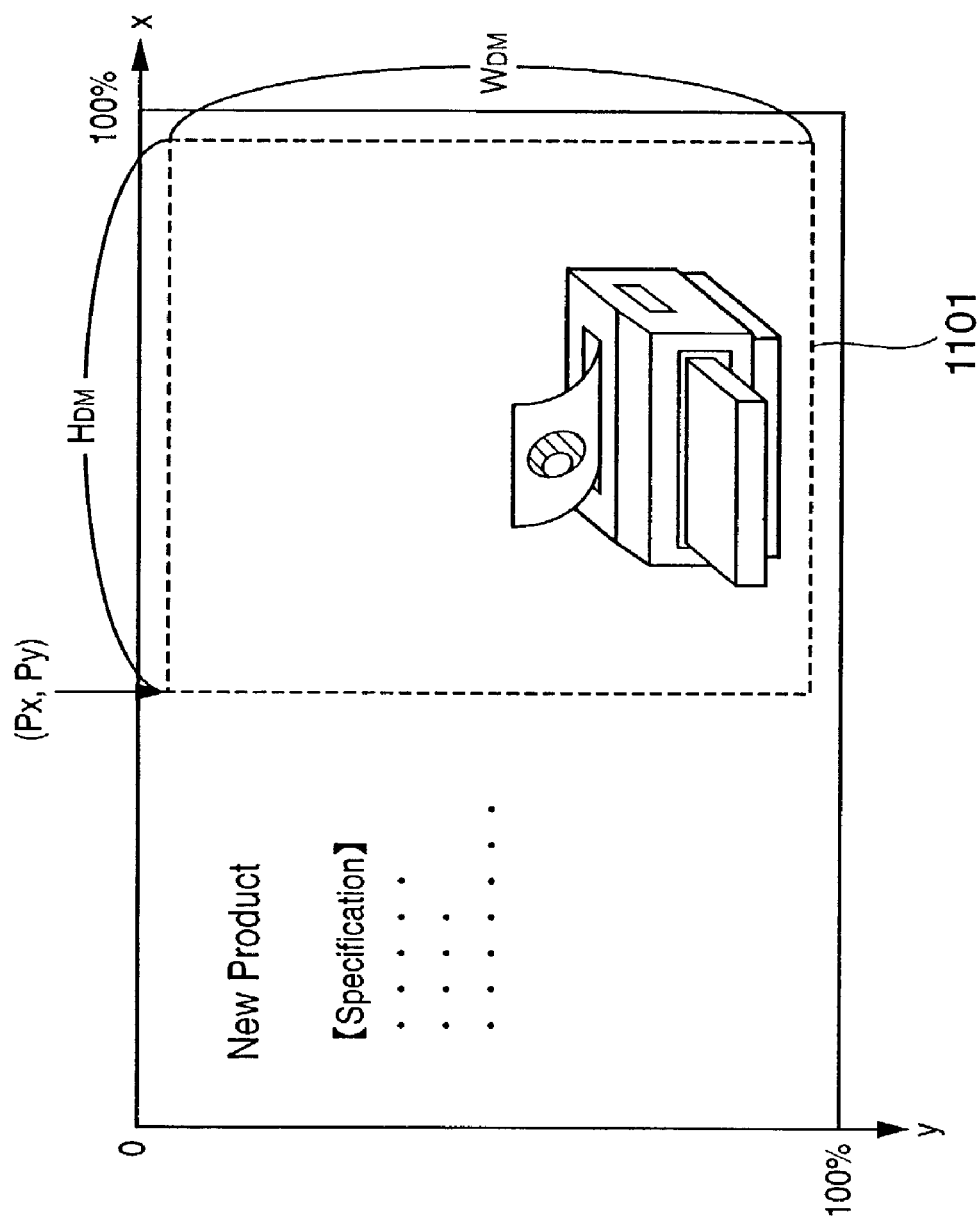
FIG. 11 shows an example of an image on which additional information is multiplexed in the second embodiment.

FIG. 11 shows an image to be printed on which the above moving image information is multiplexed. In this embodiment, assume that the user who intends to multiplex these pieces of information wants to composite the moving image information on a region 1101 of the image shown in FIG. 11. The reproduction region 1101 is expressed by the upper left coordinate position ($P_x$, $P_y$) as the origin of this region, and a size $H_{DM} \times W_{DM}$ pixels upon reproduction, as shown in FIG. 11. The unit is %, and the vertical and horizontal sizes of the image to be printed are respectively defined to be 100%.

Figure 12:
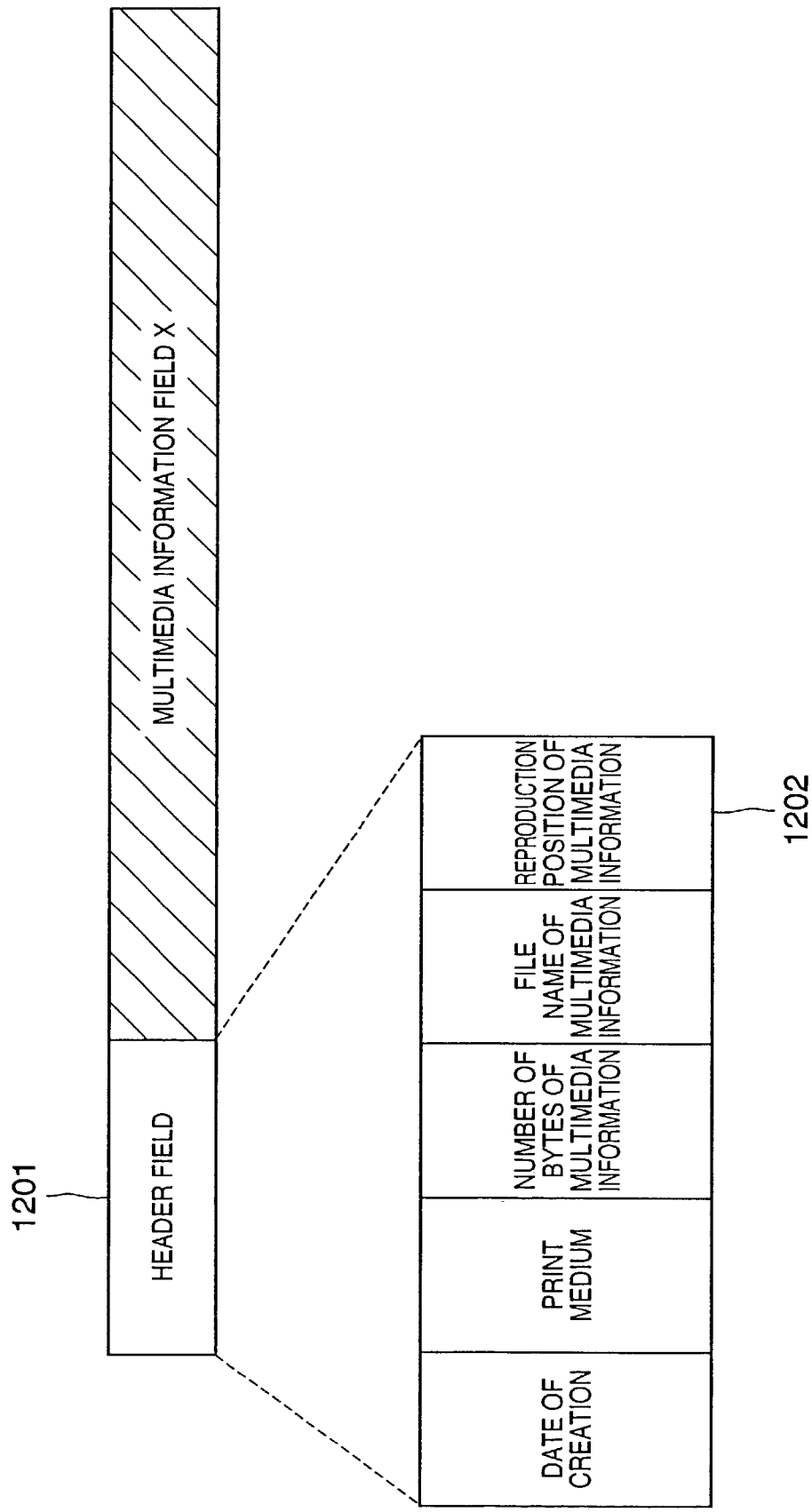
FIG. 12 shows a multiplexing format in the second embodiment.

Since these pieces of information are required on the reproduction side, the additional information generator 206 in FIG. 2 must store them in the header field of the multiplexing format. FIG. 12 shows the multiplexing format in the second embodiment. Unlike in the first embodiment, a header field 1201 includes an area for storing a reproduction position 1202 of multimedia information, and stores the reproduction position information ($P_x$, $P_y$, $H_{DM}$, $W_{DM}$) in units of Q bits.

The subsequent print process is substantially the same as that in the first embodiment, and the decoding process is nearly the same as that in the first embodiment.

Image information on an output print is scanned using the optical scanner 209 such as a scanner or the like. The scan resolution must be equal to or higher than the print resolution. The scanned image information ($H'_S \times W'_S$ pixels) is input to the additional information demultiplexer 210, which analyzes the regularity of the texture generated in the print process, thereby demultiplexing multiplexing information Z' embedded in the print.

The demultiplexed multiplexing information Z' is input to the error correction decoder 211. The error correction decoder 211 executes an error correction process, and additional information Y' obtained as a result of that process is input to the contents display unit 212, which reproduces contents using appropriate means depending on the type of appended multimedia information.

Figure 13:
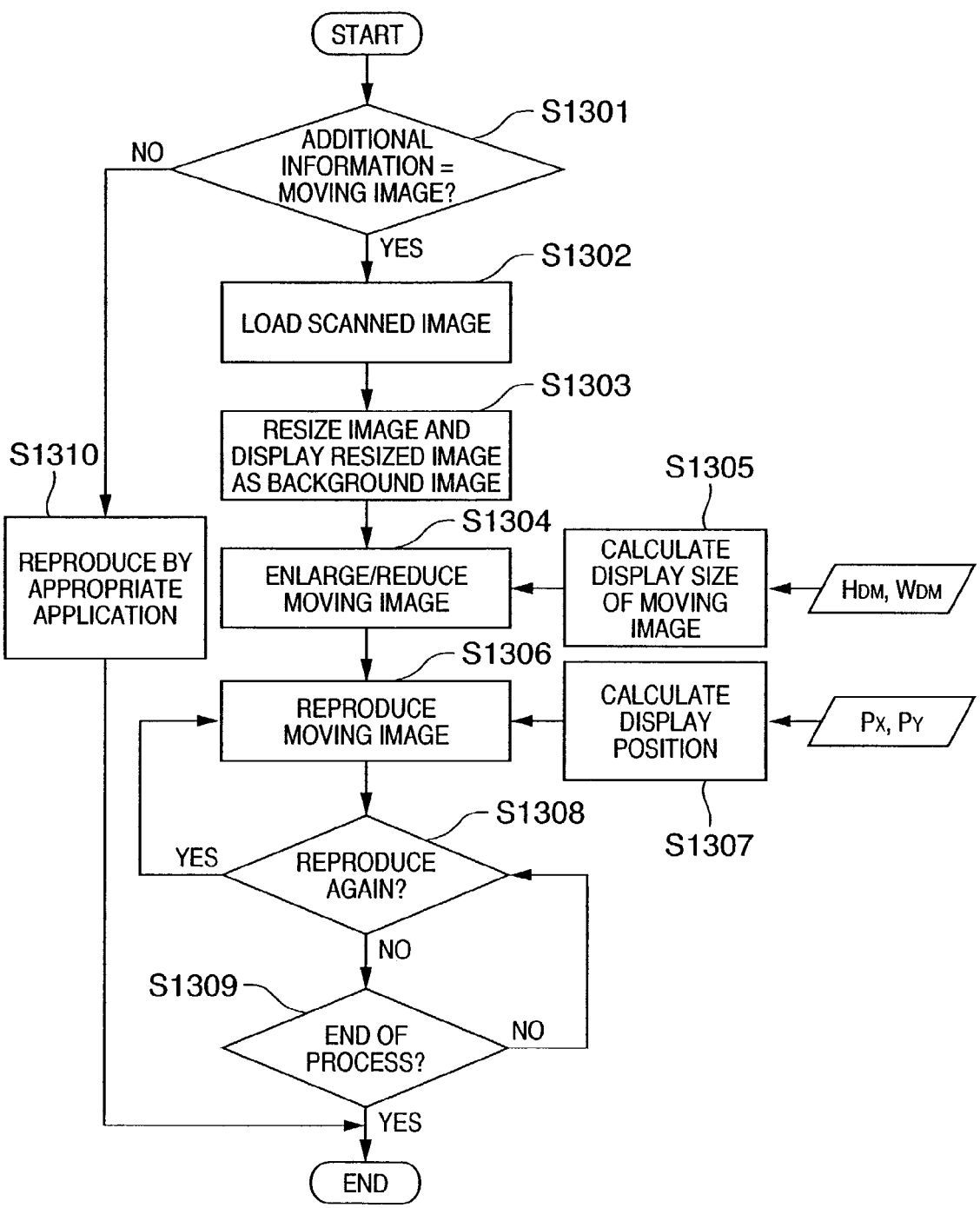
FIG. 13 is a flow chart showing the contents display processing sequence in the second embodiment.

FIG. 13 shows the flow of the process of the contents display unit 212 in the second embodiment. The process of the contents display unit 212 will be described below with reference to FIG. 13.

It is checked in step S1301 if the demultiplexed multiplexing information is a moving image. This checking process is implemented using the extension of the file name of the multimedia information contained in the header field of the additional information Y'. That is, if the file extension is "GIF", "MPG", or an extension indicating another moving image format, the flow advances to step S1302; otherwise, the multimedia information is reproduced using an application corresponding to the extension in step S1310. The image information ($H'_S \times W'_S$ pixels) scanned by the scanner 209 is loaded in step S1302, and is resized to a display size of $H_D \times W_D$ pixels (FIG. 14) and is displayed on a viewer 1401 for display as a background image in step S1303. As the resize method, any of nearest neighbor interpolation, linear interpolation, and the like, which are known to those who are skilled in the art, can be used.

In step S1304, the decoded moving image information X ($H_M \times W_M$ pixels) is resized to a display size calculated in step S1305. With this process, the moving image information is resized to:

Vertical: $H_D \times H_{DM}/100$ Horizontal: $W_D \times W_{DM}/100$

In step S1306, the moving image information is reproduced to be superposed on the background image at a display position calculated in step S1307. The display position ($P'_x$, $P'_y$) is given by:

$(P'_x, P'_y) = \{W_D \times P_x/100, H_D \times P_y/100\}$

Figure 14:
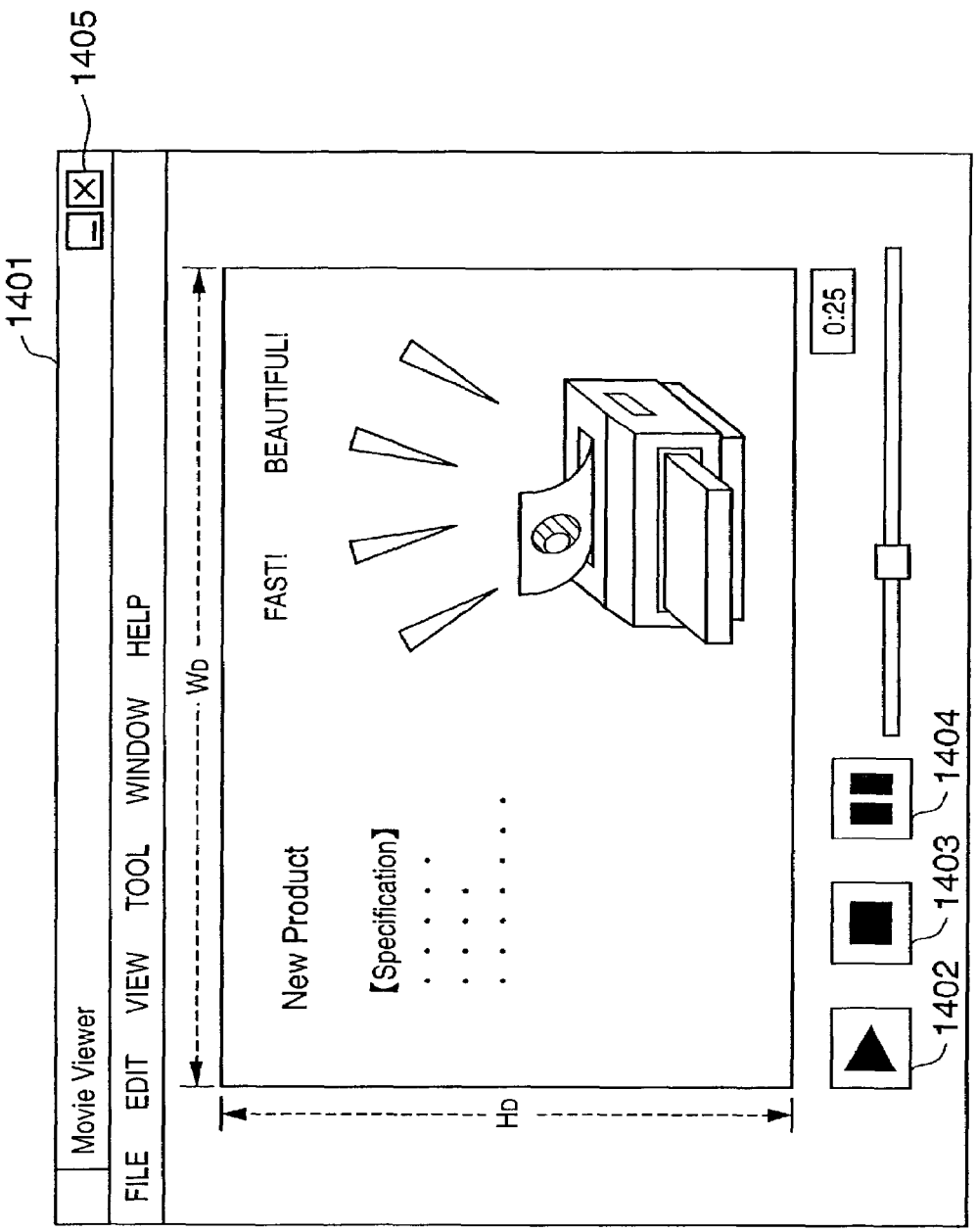
FIG. 14 shows an example of a displayed moving image in the second embodiment.

FIG. 14 shows an example of the moving image reproduction process, i.e., a state in which text and ornaments are flickering on the scanned image. The user can control the moving image using a play button 1402, pause button 1404, stop button 1403, process end button 1405, and the like of the viewer 1401. After completion of reproduction, if it is determined in step S1308 that the play button has been pressed, the moving image reproduction process is executed again; if it is determined in step S1309 that the process end button has been pressed, the processing ends.

The flow of the process in the second embodiment has been explained. As has been described in the second embodiment, by compositing an image scanned by the scanner and moving image information embedded in that image, entertaining print, restoration, and reproduction processes, which cannot be realized by the prior art, can be implemented. In this embodiment, only a piece of moving image information is selected as additional information. However, the number of pieces of moving image information is not limited to one. Also, moving image information and information different from moving image information such as audio information or the like may be multiplexed together in a print image region, and the audio information may be reproduced simultaneously with the moving image information. Such application is also included in the scope of the present invention.

Figure 15:
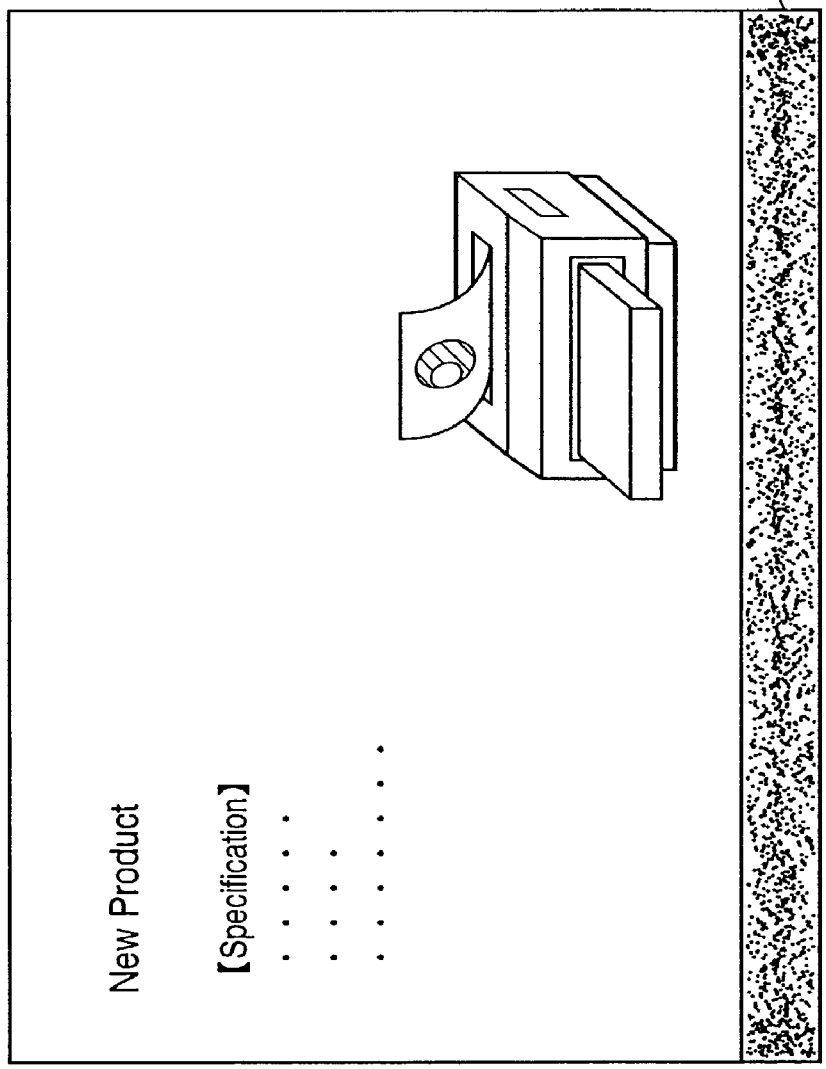
FIG. 15 shows an example of a print when moving image information is appended by a dot code in the second embodiment.

This embodiment adopts a technique for invisibly embedding additional information in an image. Also, the same effect can be obtained by printing a two-dimensional dot code or bar code shown in FIG. 15. In FIG. 15, reference numeral 1501 denotes a two-dimensional dot code region, where moving image information is printed as an ON/OFF pattern of dots. On the reproduction side, the moving image information is restored by scanning the region 1501, and is composited with image information obtained by scanning an image region, thereby obtaining the same effect as that the present invention aims at. Of course, such case is included in the scope of the present invention.

As described above, according to the first and second embodiments, upon printing an arbitrary image by the printer, combinations of quantization values which cannot be produced by normal pseudo halftoning are artificially generated to generate regularity in texture produced by error diffusion to embed a code, thus multiplexing arbitrary additional information in an image region. When moving image information is selected as additional information, and the decoding side composites and displays the moving image information and an image which serves as an information multiplexing region, it becomes easy to create entertaining greeting cards such as New Year's cards and the like, and direct mail messages with high advertising effects and the like.

To restate, according to the first and second embodiments, upon scanning a print, since additional information recorded together with that print is reproduced while displaying the scanned image, a special effect that cannot normally be obtained with still images can be obtained.

Third Embodiment

An image processing system according to the third embodiment of the present invention will be described below with reference to the accompanying drawings. Note that the image processing system proposed by the present invention comprises two different types of image processing apparatuses, i.e., an image processing apparatus for embedding additional information in image information, and printing the image information, and an image processing apparatus for inputting the printed image via an image scanner to extract the additional information.

Figure 16:
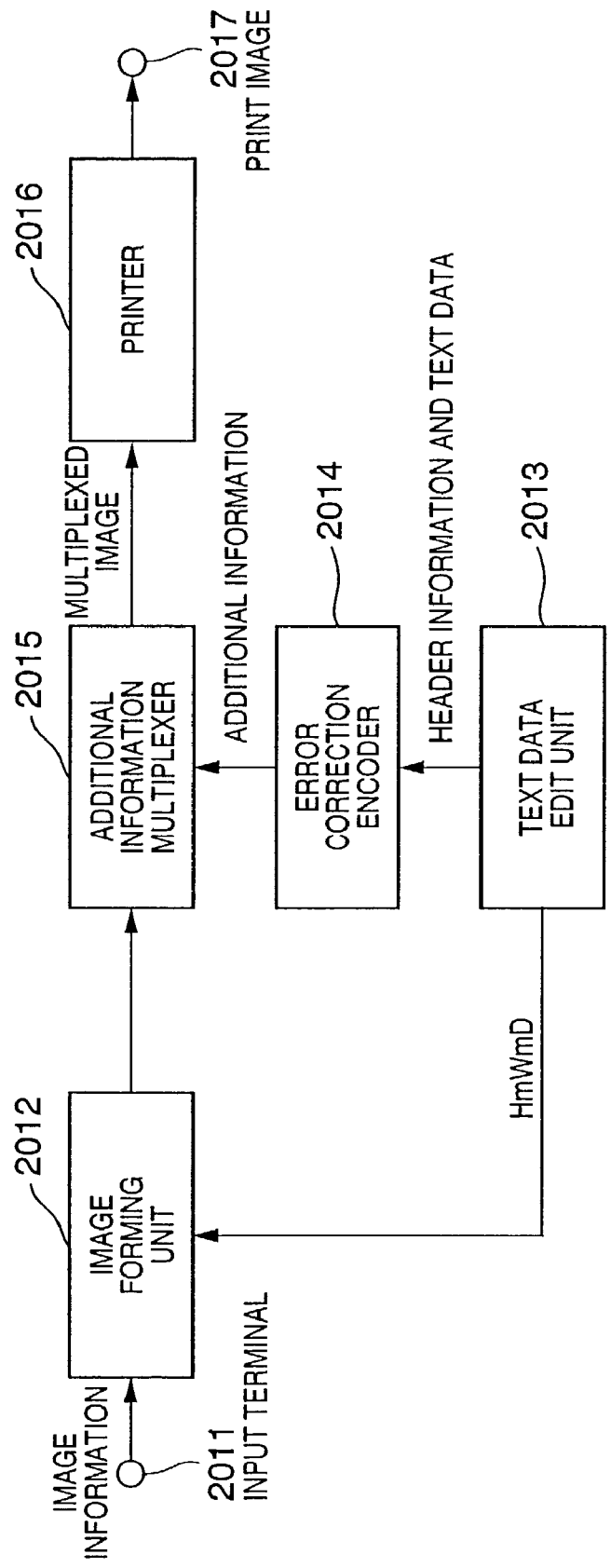
FIG. 16 is a block diagram showing the arrangement of an image processing apparatus for embedding additional information in image information, and printing that image information according to the third embodiment of the present invention.

FIG. 16 is a block diagram showing the arrangement of the image processing apparatus for embedding additional information in image information, and printing the image information. An input terminal 2011 is used to input an image which is to undergo multiplexing on which additional information is embedded. The input terminal 2011 is connected to an image forming unit 2012. The image forming unit 2012 is a device for converting the resolution of input image information to that suitable for a print process.

The image forming unit 2012 is connected to a text data edit unit 2013 and additional information multiplexer 2015. The text data edit unit 2013 is a device for receiving and editing additional information (text data) to be appended to image information. The text data edit unit 2013 is connected to an error correction encoder 2014. The error correction encoder 2014 is a device for appending check bits for error correction to the edited text data.

The error correction encoder 2014 is connected to the additional information multiplexer 2015. The additional information multiplexer 2015 is a device for embedding the additional information that has undergone error correction to the resolution-converted image information. The additional information multiplexer 2015 is connected to a printer 2016. The printer 2016 is a device for printing the image information (multiplexed information) embedded with the additional information on a recording medium such as a sheet surface, and outputting a print image 2017.

Figure 17:
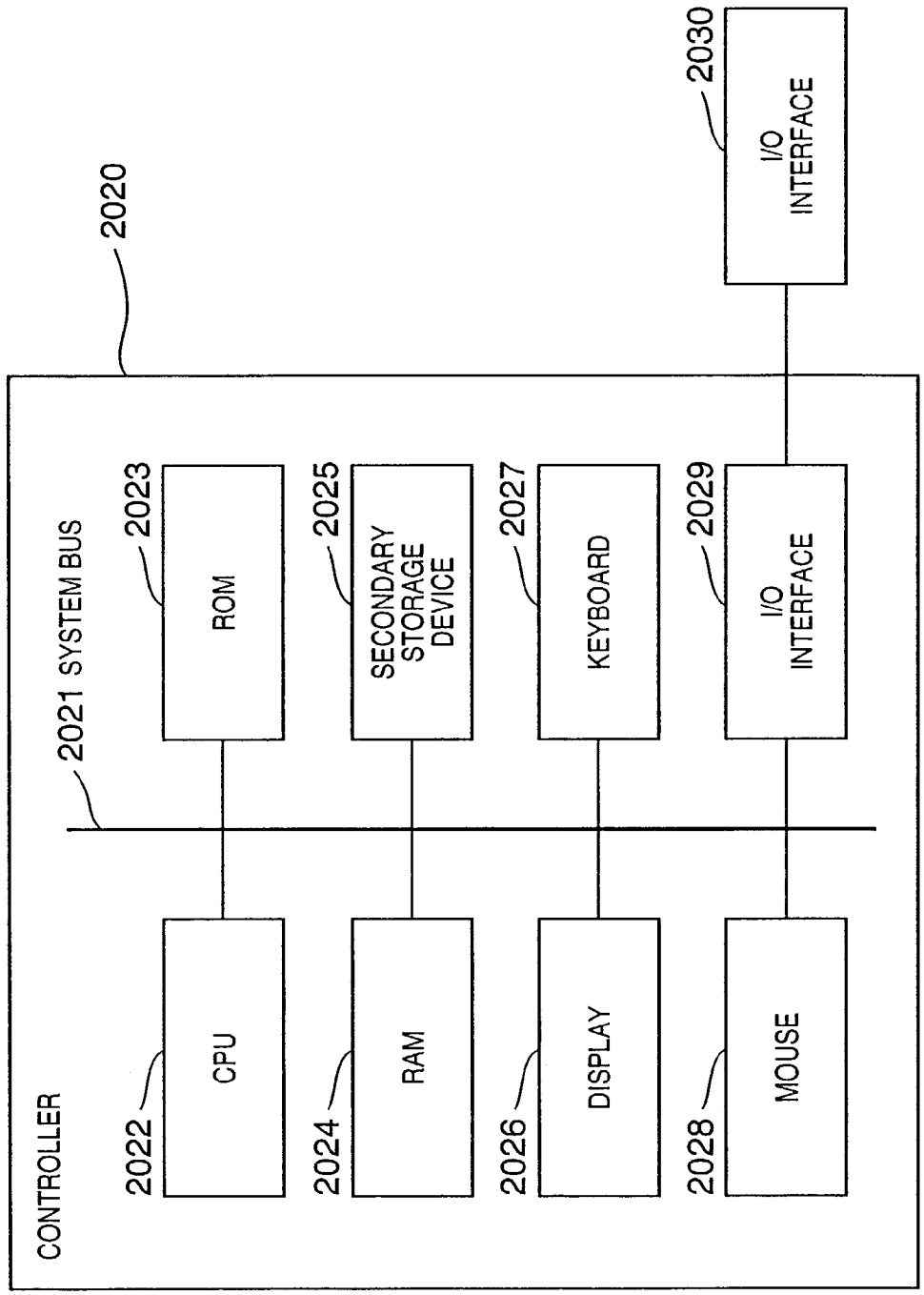
FIG. 17 is a schematic block diagram for explaining a controller 2020 used to execute operations of respective processors in the present invention.

Note that the processes in this image processing apparatus are executed using a controller 2020 shown in FIG. 17. FIG. 17 is a schematic block diagram for explaining the controller 2020 which executes the operations of respective processors in the present invention. In FIG. 17, a CPU 2022, ROM 2023, RAM 2024, and secondary storage device 2025 (e.g., a hard disk or the like) are connected to a system bus 2021. As a user interface, a display 2026, keyboard 2027, and mouse 2028 are connected to the CPU 2022 and the like. Furthermore, the system bus 2021 is connected to an I/O interface 2029 which connects an I/O interface 2030 for the image output printer 2016 or the like.

Figure 18:
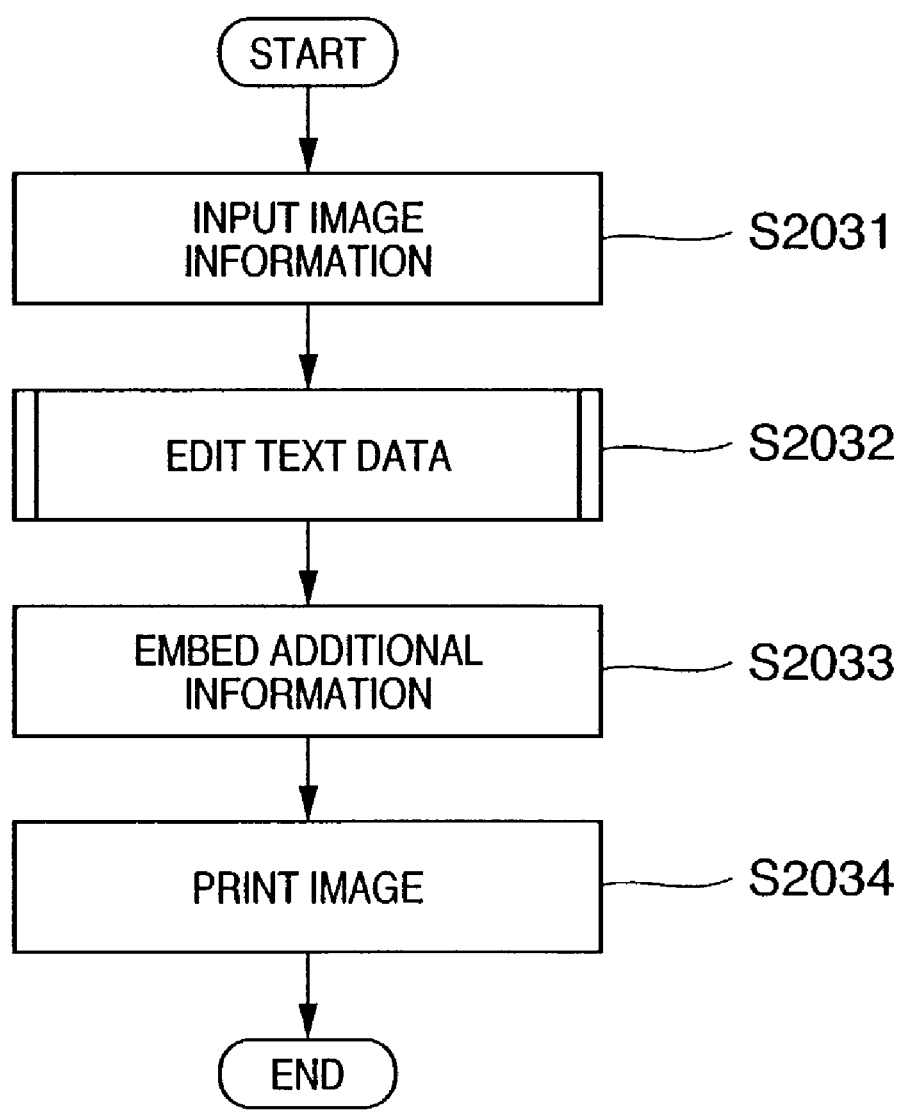
FIG. 18 is a flow chart for explaining the operation sequence of the image processing apparatus according to the third embodiment.
Figure 19:
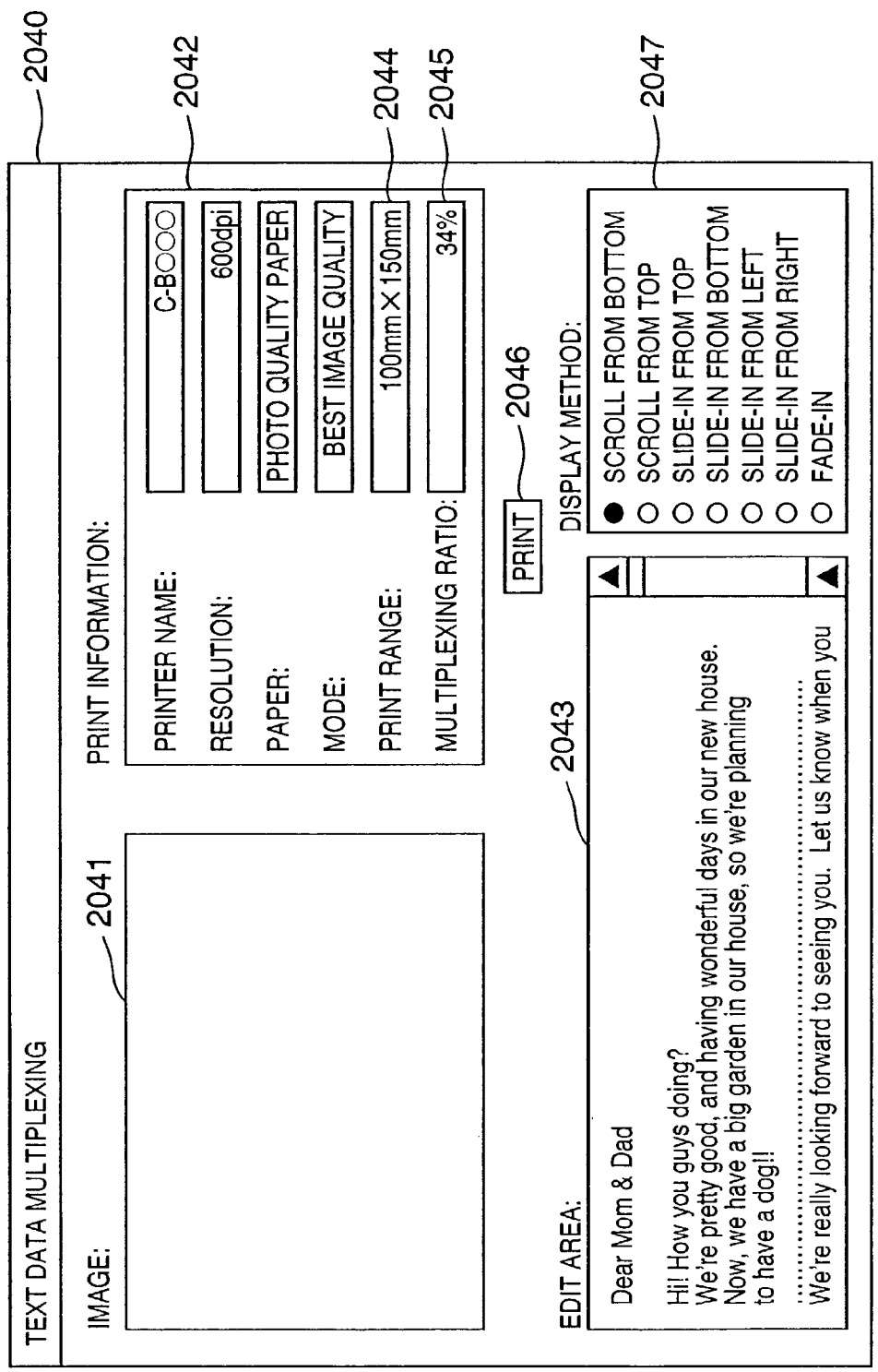
FIG. 19 shows a general GUI window used in an edit process of a text data edit unit 2013.

The operation sequence of the image processing apparatus of the aforementioned embodiment will be explained below. FIG. 18 is a flow chart for explaining the operation sequence of the image processing apparatus according to this embodiment. Arbitrary image information input from the input terminal 2011 is input to the image forming unit 2012 (step S2031). The text data edit unit 2013 receives and edits text data to be appended to the image information (step S2032). FIG. 19 shows a general GUI (Graphical User Interface) window used in the edit process of the text data edit unit 2013. This GUI window is displayed on the display 2026.

Referring to FIG. 19, a text data multiplexing window 2040 mainly includes an area 2041 for displaying image information input from the input terminal 2011, an area 2042 for inputting and displaying setup information upon printing that image information, an area 2043 for editing text data to be multiplexed in the image information, and an area 2047 for designating a display method of the edited data upon restoring the embedded additional information.

Figure 20:
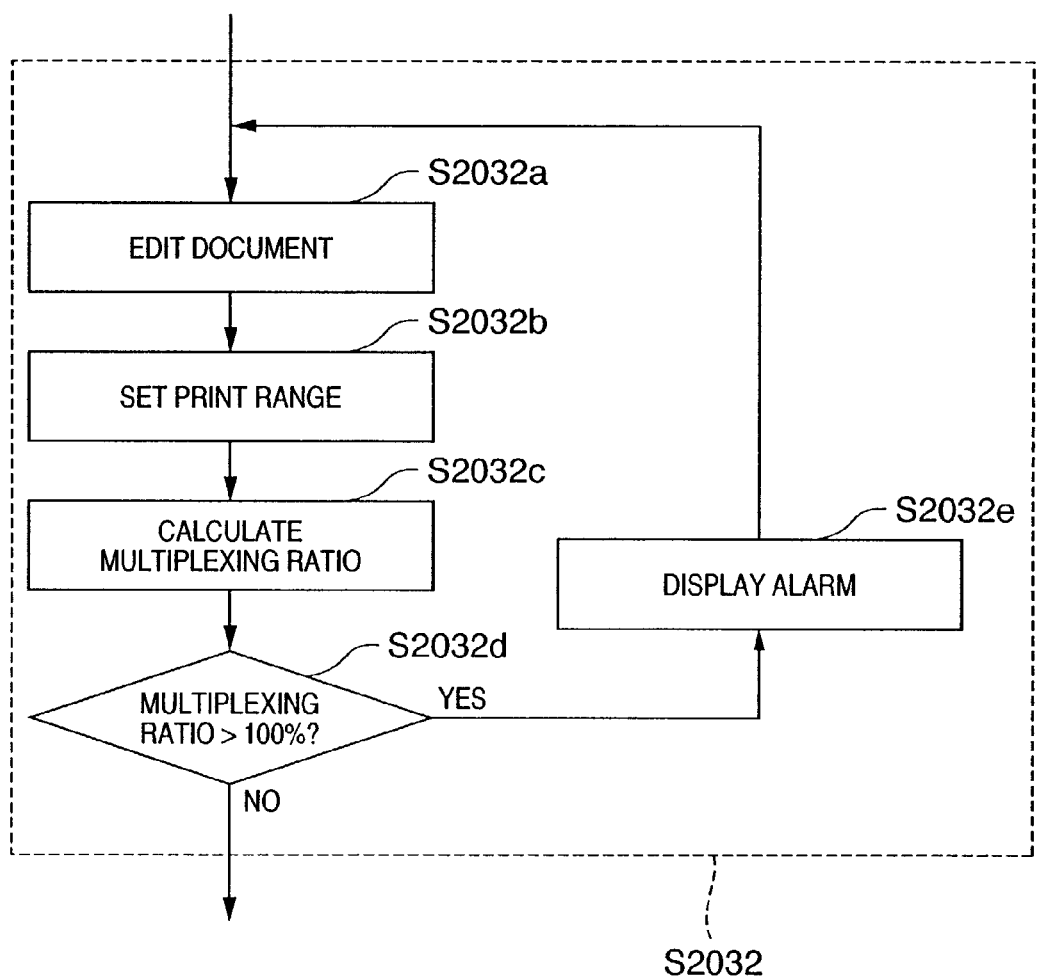
FIG. 20 is a flow chart for explaining details of a text data edit process (step S2032) in the text data edit unit 2013.

FIG. 20 is a flow chart for explaining details of the text data edit process (step S2032) in the text data edit unit 2013. The user inputs and edits text or the like to be multiplexed in image information on the edit area 2043 on the GUI window shown in FIG. 19 using the mouse 2028 or keyboard 2027 (step S2032a). In an example on the GUI window shown in FIG. 19, 2-byte kana-kanji codes (e.g., Shift-JIS or the like) are input, but alphanumeric characters of ASCII codes may be also input.

The user can set and change print information on the print information area 2042 using the mouse 2028 or keyboard 2027. On the print information area 2042, a printer used to print image information, print resolution [dpi], type of paper, and print mode can be set.

Furthermore, the area 2044 is used to set a print range. The user inputs a width $W_m$ [mm] and height $H_m$ [mm] of the print range on the recording medium such as a sheet surface or the like (step S2032b). In an example of the GUI window in FIG. 19, $W_m$=150 mm and $H_m$=100 mm are set. These values are input to the image forming unit 2012, and image information of h pixels×w pixels is converted to H pixels×W pixels as the size of the print resolution. In this conversion, the values of H' and W' are calculated first by:

$$\begin{cases} H' = \frac{H_m}{25.4} \times D + 0.5 \\ W' = \frac{W_m}{25.4} \times D + 0.5 \end{cases}$$

Figure 21:
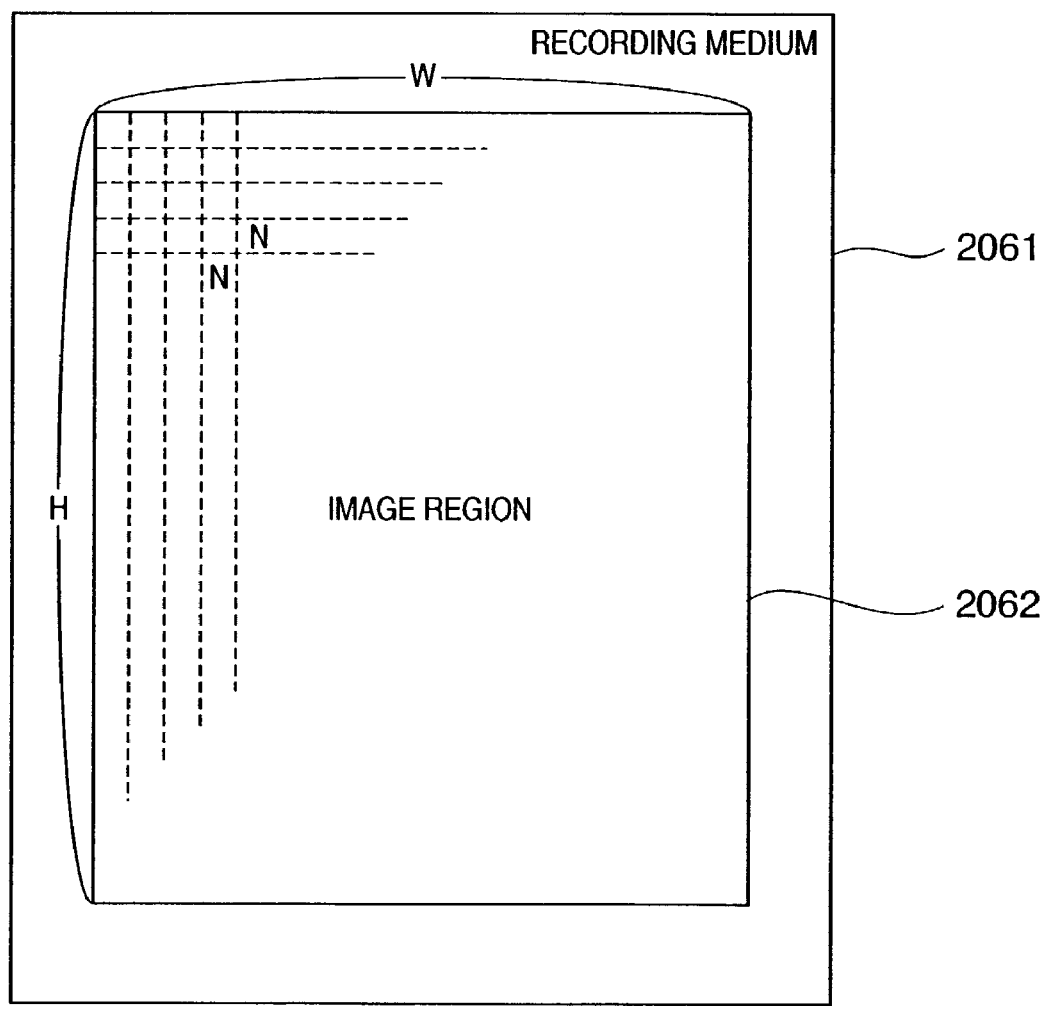

Then, a maximum integer equal to or smaller than H' is set as H, and a maximum integer equal to or smaller than W' is set as W. That is, H pixels×W pixels are used as the size in the print process. FIG. 21 is a view for explaining an image region 2062 printed on a recording medium 2061 such as a sheet surface or the like. Note that each square block bounded by dotted lines consists of N×N pixels as a unit of multiplexing additional information in the additional information multiplexer 2015. As means for resolution conversion, any of nearest neighbor interpolation, linear interpolation, and the like, which are known to those who are skilled in the art, can be used.

The print information area 2042 includes a display field 2045 of a multiplexing ratio R. Note that the multiplexing ratio R indicates a ratio that the total size including check bits for error correction appended by the error correction encoder 2014 to text data, the edit process of which is underway, takes up in a maximum size that can be multiplexed.

The additional information multiplexer 2015 breaks up an image obtained after the image which is to undergo multiplexing has been converted to the resolution of H pixels×W pixels as the print size into N×N (pixel) square blocks, and embeds additional information for respective blocks. Hence, when 1-bit additional information is to be embedded per block, an information size $I_{max}$ [Byte] that can be multiplexed is given by:

$$I_{max} = (I_1 + I_2) \times \frac{1}{8} \text{ [Byte]}$$

where $I_1$ and $I_2$ are respectively maximum integers which are equal to or smaller than values H/N and W/N.

Using this equation, if the total size of text data, the edit process of which is underway, is I [Byte], and header information to be described later is $I_{Header}$ [Byte], the multiplexing ratio R can be calculated (step S2032c) using:

$$R = \left( \frac{(I + I_{Header}) \times \frac{n}{k}}{I_{max}} \right) \times 100 \text{ [\%]}$$

where n and k are error correction parameters when the error correction encoder 2014 uses a BCH(n, k, d) code. Note that BCH(n, k, d) represents a BCH code which can correct t-bit errors by appending (n-k) check bits to k-bit information. Note that t is a maximum integer which is equal to or smaller than d/2.

It is then checked if the multiplexing ratio R has exceeded 100% (step S2032d). As a result, if the multiplexing ratio R has exceeded 100% (YES), an alarm window shown in FIG. 22 is displayed (step S2032e). FIG. 22 shows a GUI window when the multiplexing ratio R has exceeded 100% and an alarm window 2071 is displayed. This image processing apparatus inhibits a print process when the alarm window 2071 is displayed. Therefore, the user must either reduce the number of characters of text, the edit process of which is underway, or enlarge the print range 2044 until the contents of the multiplexing ratio display field 2045 become equal to or smaller than 100%.

Upon completion of the user's text data edit process, if the multiplexing ratio R is equal to or lower than 100% (NO), this image processing apparatus is ready to start a print process. Then, the user clicks a print button 2046 with the mouse 2028, thereby executing the print process.

Figure 23:
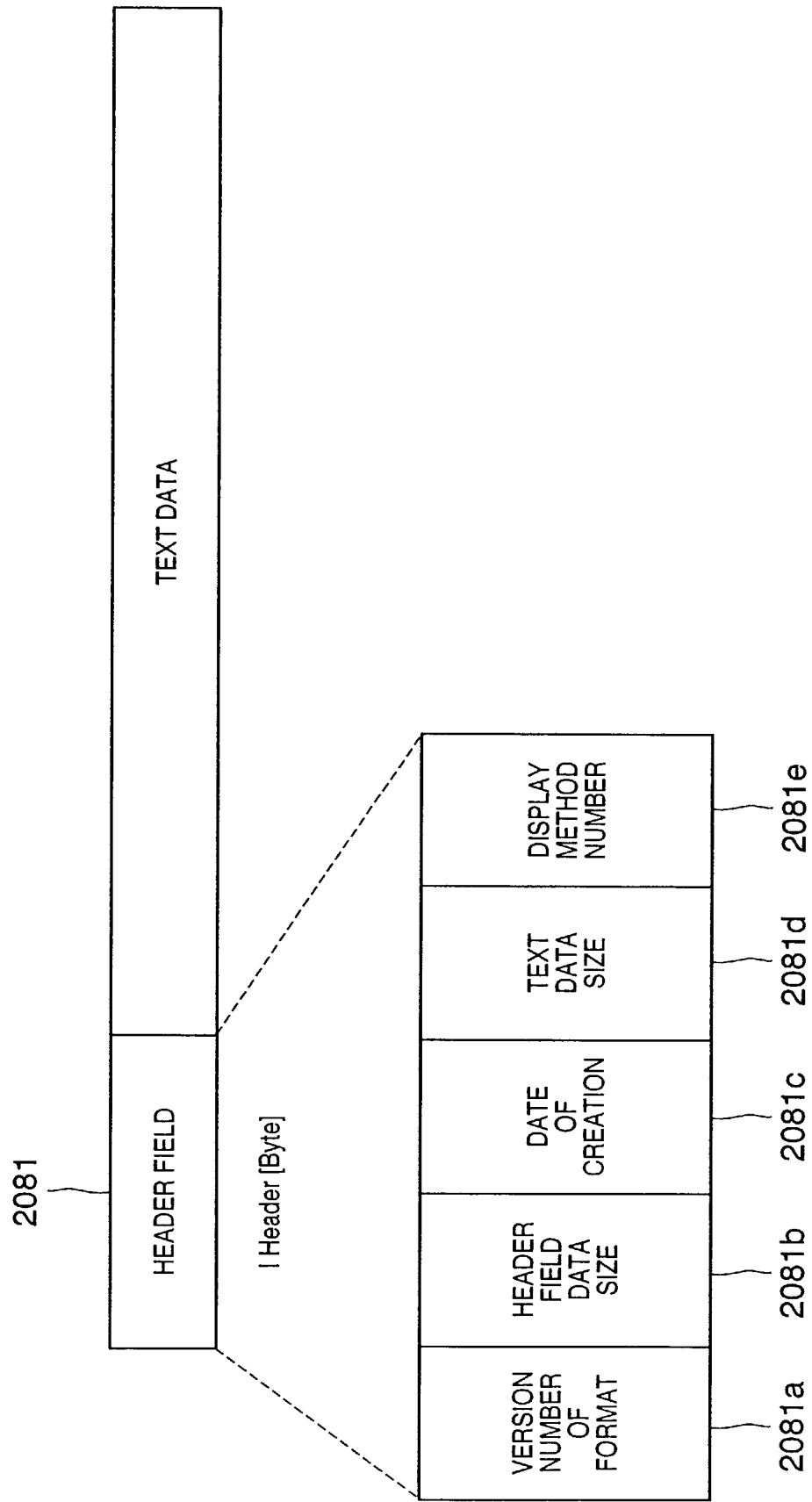
FIG. 23 shows a header field 2081 of text data.

If the print button 2046 has been pressed, the text data edit unit 2013 generates a header field of the text data. FIG. 23 shows a header field 2081 of the text data. As shown in FIG. 23, the header field 2081 stores a version number 2081a of the multiplexing format, a header field data size 2081b, a date of creation 2081c of the print image, an edited text data size 2081d, and a display method number 2081e indicating the display method of text data on the decoding side that the user selected on the area 2047 in FIG. 19. Note that the header field data size 2081b is $I_{Header}$ [Byte]. Also, the text data size 2081d is I [Byte].

FIG. 24 shows a list of display method numbers 2081e in the header field 2081. As shown in FIG. 24, seven different methods are defined as display methods of text data on the decoding side in this embodiment, and numbers are assigned to those methods. For example, in the example in FIG. 19, since "scroll from bottom" is selected, "0x01" is stored in the display method number 2081c in FIG. 23.

Figure 25:
FIG. 25 shows a bitstream associated with text data when check bits for error correction are appended.

Upon completion of generation of the header field 2081 of the text data, a bitstream, in which the header field is set at a head position, and the edited text data follows, is formed, as shown in FIG. 25. FIG. 25 shows a bitstream associated with text data when check bits for error correction are appended. The bitstream is input to the error correction encoder 2014, and check bits for error correction are appended to both the header field and text data. As described above, this embodiment uses a BCH code as an error correction code, but any other state-of-the-art methods such as a Reed-Solomon code, convolution code, Peterson code, and the like may be used.

The text data appended with check bits for error correction is input to the additional information multiplexer 2015, and is embedded in the resolution-converted image information (step S2033). The additional information multiplexer 2016 visually unobtrusively embeds text data in image information. This method is described in Japanese Patent Laid-Open No. 2001-148778, With this method, an input image is segmented into square blocks each consisting of N×N pixels, and quantization threshold values of error diffusion are periodically changed for respective blocks. In this case, when this periodicity is changed in correspondence with a code of a bit of additional information, texture which cannot be produced by normal error diffusion can be generated for respective blocks.

Changes in pixels caused by this process are microscopic, and the density state is preserved since error diffusion is used. Hence, large-size information can be multiplexed in an image region without deteriorating the quality of the printed image. Note that the additional information may be image information, audio information, and the like in addition to text data.

The image information that has undergone error diffusion using the aforementioned method in the additional information multiplexer 2015 is printed on a recording medium such as a sheet surface or the like by the printer 2016, thus outputting the print image 2017 (step S2034).

The image processing apparatus for embedding additional information in image information and printing the image information has been explained. The image processing apparatus for inputting the printed image via an image scanner to extract the additional information will be described below.

Figure 26:
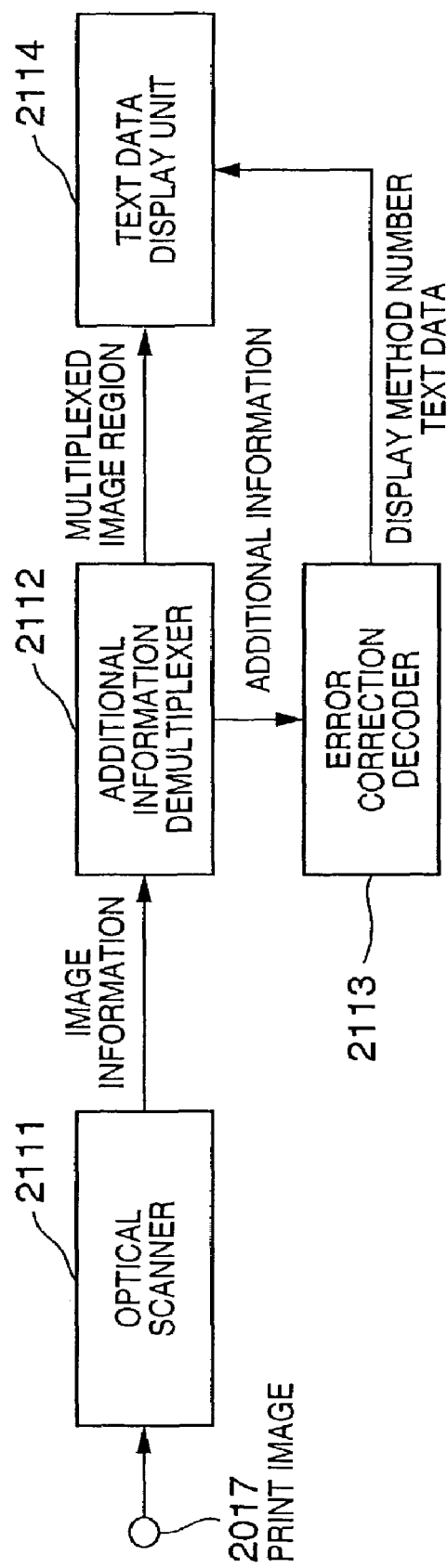
FIG. 26 is a block diagram showing the arrangement of an image processing apparatus for inputting a printed image using an image scanner, and extracting additional information from the image.

FIG. 26 is a block diagram showing the arrangement of the image processing apparatus for inputting the printed image via an image scanner to extract the additional information. Referring to FIG. 26, an optical scanner 2111 is a device such as an image scanner or the like, which scans the print image 2017 obtained by printing the image embedded with additional information. The optical scanner 2111 is connected to an additional information demultiplexer 2112. The additional information demultiplexer 2112 restores additional information by detecting a multiplexed region of an image where additional information is embedded, segmenting the region into square blocks each consisting of N×N pixels, and verifying the periodicity of texture for each block. Since details of such processing contents are disclosed in Japanese Patent Laid-Open No. 2001-148779, a description thereof will be omitted.

The additional information demultiplexer 2112 is connected to an error correction decoder 2113 and text data display unit 2114. The multiplexed region detected by the additional information demultiplexer 2112 is input to the text data display unit 2114. The additional information demultiplexed from the multiplexed region is input to the error correction decoder 2113. The error correction decoder 2113 executes an error correction process using check bits appended upon generating the print image 2017.

The error correction decoder 2113 is connected to the text data display unit 2114. The header field and text data decoded by the error correction decoder 2113 are input to the text data display unit 2114.

Figure 27:
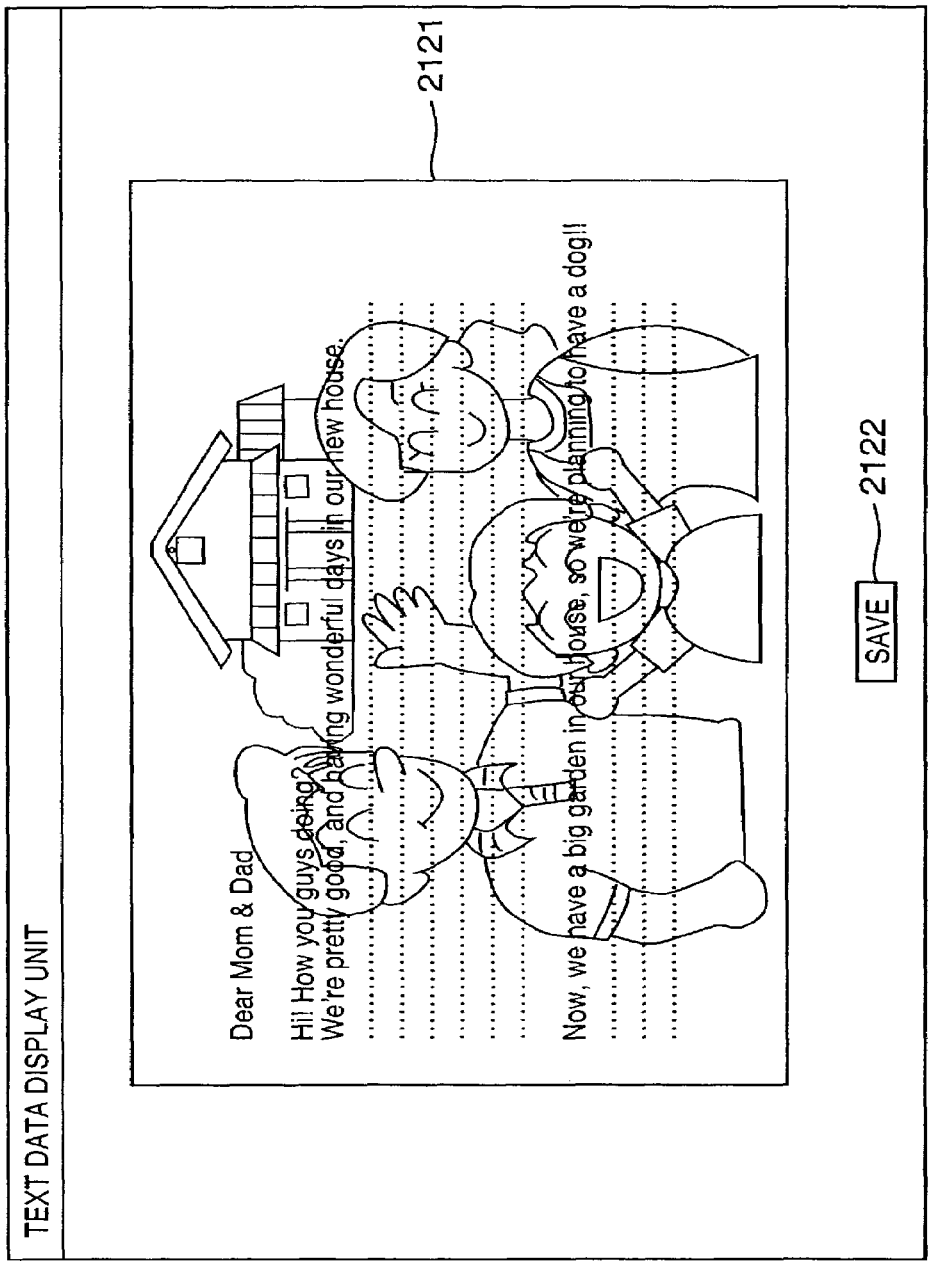
FIG. 27 shows an example of a GUI window used to display text data by a text data display unit 2114.

FIG. 27 shows an example of a GUI window used to display text data by the text data display unit 2114. Such GUI window is displayed on the display 2026. An area 2121 in FIG. 27 is used to display the image which is to undergo multiplexing and text data, which are input to the text data display unit 2114. In this embodiment, the restored text data is dynamically displayed by the method designated by the display method number 2081e contained in the header field. FIG. 28 shows a GUI window when the window of text data shown in FIG. 28 has scrolled. As shown in FIGS. 27 and 28, in this embodiment, the restored text data scrolls from the bottom to top.

In this way, since text data which is unobtrusively embedded in the image which is to undergo multiplexing is displayed using that image as a background image, the sense of identity of the image and text data can be improved compared to a case wherein they are displayed independently. For example, this process is particularly effective when the image which is to undergo multiplexing is a facial image of a viewer's friend, and text data is a greeting message for that viewer, created by that viewer's friend.

That is, the present invention is characterized by comprising demultiplexing means (additional information demultiplexer 2112) for demultiplexing additional information from an image (print image 2017) embedded with predetermined additional information (text data) to acquire an image which is to undergo multiplexing before additional information is embedded, and display means (text display unit 2114) for displaying the image which is to undergo multiplexing and additional information together.

Also, the present invention is characterized in that when the additional information has a predetermined data size or more, the display means (text data display unit 2114) displays the additional information by scrolling a display screen.

Furthermore, the present invention is characterized in that the demultiplexed additional information is predetermined document information.

Moreover, the present invention is characterized in that the additional information is displayed using an image which is to undergo multiplexing as a background image.

In addition, the present invention is characterized in that the additional information has display method designation information (display method number 2081e) associated with designation of a display method upon display, and the display means displays the additional information on the basis of the display method designation information.

Further, the present invention is directed to an image processing apparatus which has input means (text data edit unit 2013) for inputting predetermined additional information, and multiplexing means (additional information multiplexer 2015) for embedding the input additional information in a predetermined image, characterized in that the input means has total data size calculation means for calculating the total data size of the additional information, maximum data size calculation means for calculating a maximum data size that can be embedded in the image, comparison means for comparing the total and maximum data sizes, and alarm information display means for, when the total data size is larger than the maximum data size, displaying predetermined alarm information.

Note that the viewed text data can be saved in the secondary storage device 2025 by clicking a save button 2122 or 2132 using the mouse 2028.

Fourth Embodiment

This embodiment will explain an apparatus for executing a speech synthesis process of restored text data and outputting speech in addition to the third embodiment mentioned above.

FIG. 29 shows a display example of a GUI window used in the text data edit unit of this embodiment. The difference between the GUI window contents of the fourth and third embodiment is that a text data multiplexing window 2141 includes a speaker information edit area 2142. The editor of text data can designate given voice quality upon outputting speech by the speech synthesis process of the edited text data using the keyboard 2027 or mouse 2028.

Figure 31:
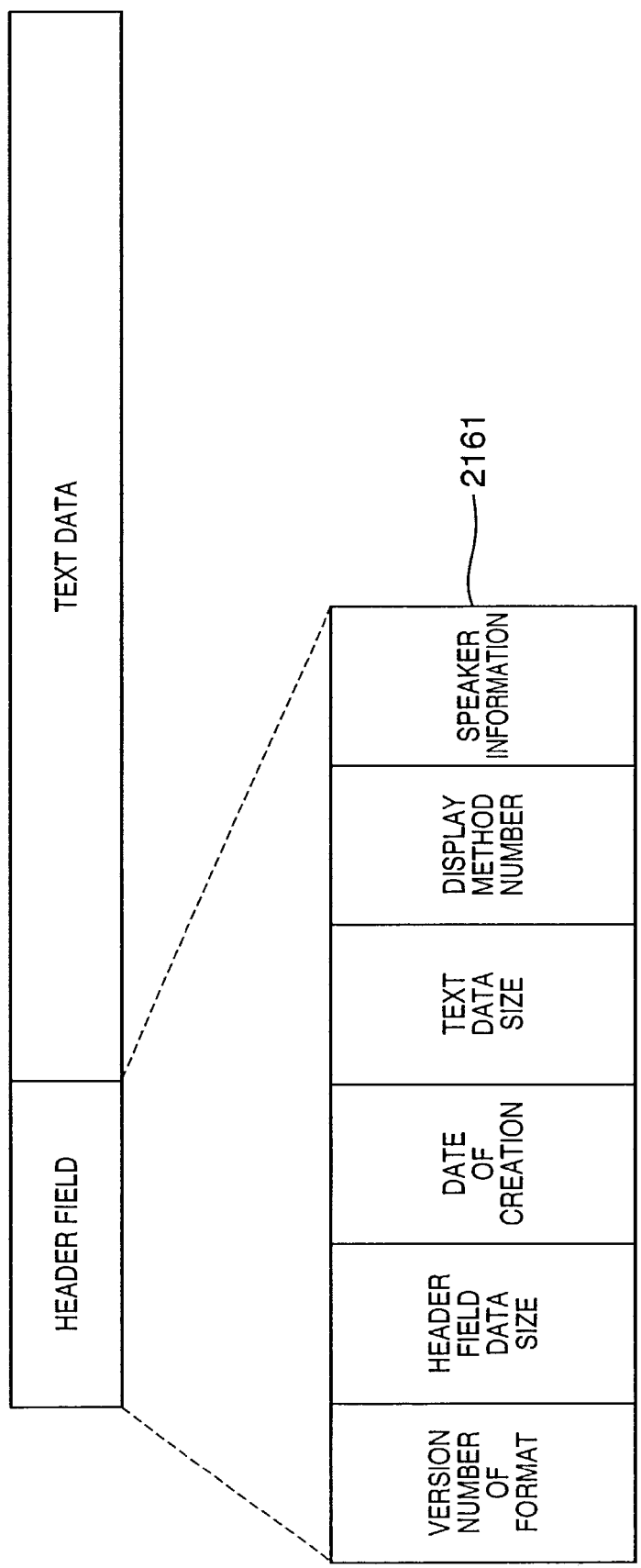
FIG. 31 shows a bitstream of text data in the fourth embodiment.

For example, in this embodiment, speaker information is defined, as shown in FIG. 30. FIG. 30 shows a list of speaker information numbers as voice quality information defined in the fourth embodiment. On the GUI window in FIG. 29, the text data editor designates a gender and age group in the area 2142 to specify one speaker information number defined in FIG. 30. FIG. 31 shows a bitstream of text data in the fourth embodiment. The specified speaker information is stored in speaker information 2161 contained in a header field shown in FIG. 31.

The edit process except for the above description is the same as that in the third embodiment.

Figure 32:
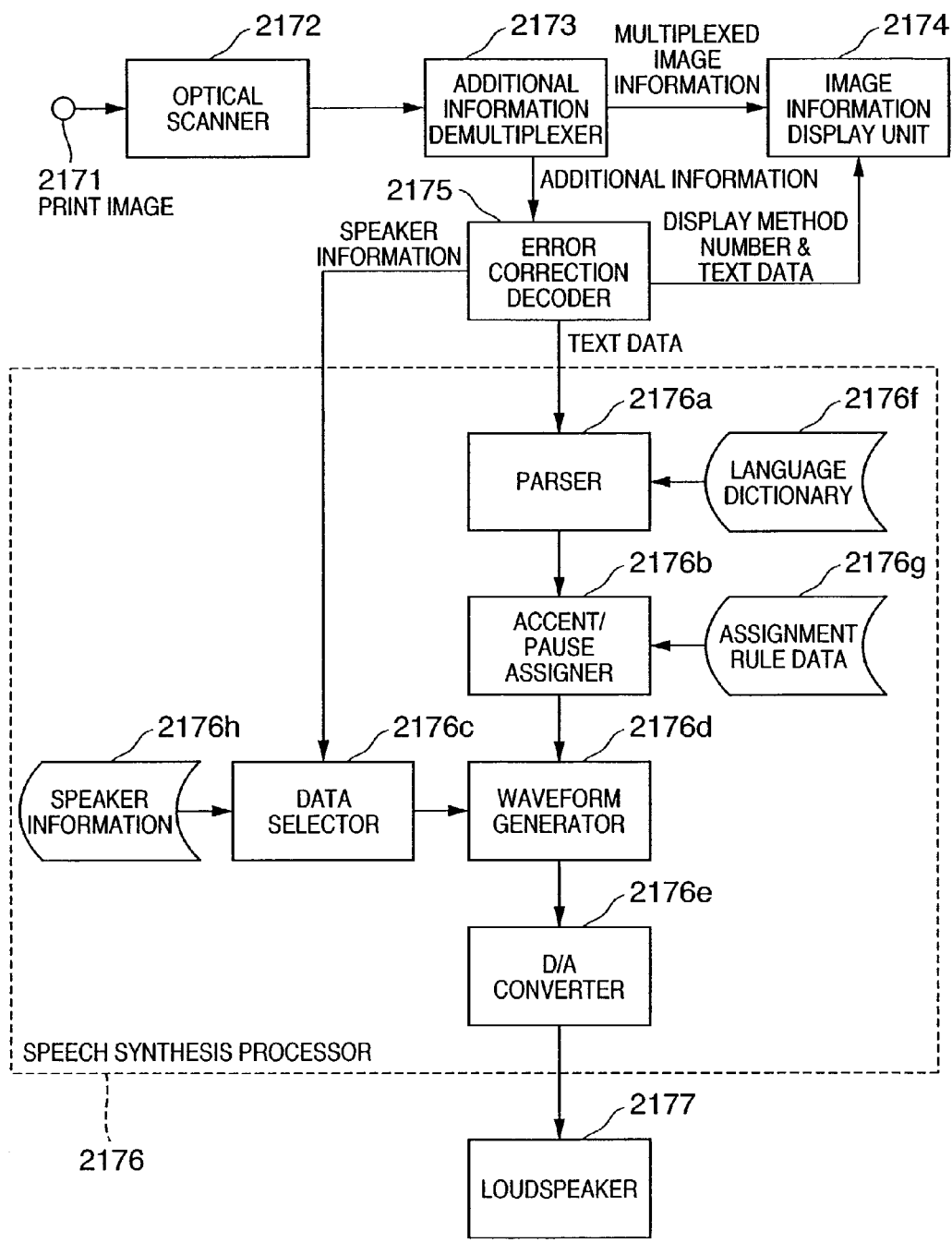
FIG. 32 is a block diagram showing the arrangement of an image processing apparatus for inputting a printing image by an image scanner, extracting additional information from the image, and outputting the extracted information as speech in the fourth embodiment.

FIG. 32 is a block diagram showing the arrangement of an image processing apparatus for inputting the printed image via an image scanner to extract the additional information, and outputting the extracted information as speech.

As shown in FIG. 32, an optical scanner 2172 is a device such as an image scanner or the like, which scans a print image 2171 embedded with additional information. The optical scanner 2171 is connected to an additional information demultiplexer 2173. The additional information demultiplexer 2173 restores additional information from an image region where the information is multiplexed by an additional information demultiplexing process disclosed in Japanese Patent Laid-Open No. 2001-148778.

The additional information demultiplexer 2173 is connected to an image information display unit 2174 and error correction decoder 2175. The error correction decoder 2175 executes an error correction process of the demultiplexed additional information to restore the header field and text data. The image information display unit receives the display method number 2081e and text data that have undergone the error correction process, and makes display, as shown in FIGS. 27 and 28, as described in the third embodiment.

The error correction decoder 2175 is connected to a speech synthesis processor 2176. The speech synthesis processor 2176 comprises a parser 2176a for parsing text using a language dictionary 2176f, an accent/pause assigner 2176b for assigning accents/pauses, a data selector 2176c for selecting corresponding speaker data using speaker information 2176h contained in the header field, a waveform generator 2176d for synthesizing a digital speech waveform, and a D/A converter 2176e for converting the digital waveform into an analog signal.

The speech synthesis processor 2176 is connected to a loudspeaker 2177, which outputs speech.

That is, the present invention is characterized by comprising demultiplexing means (additional information demultiplexer 2173) for demultiplexing additional information from an image (print image 2171) embedded with predetermined additional information, speech conversion means (speech synthesis processor 2176) for converting the demultiplexed additional information into speech information, and speech output means (loudspeaker 2177) for outputting the speech information.

Also, the present invention is characterized in that the additional information has speech quality designation information associated with speech quality designation upon outputting speech, and the speech conversion means converts the additional information into the speech information on the basis of the speech quality designation information.

Furthermore, the present invention is characterized by further comprising display means (image information display means 2174) for displaying an image which is to undergo multiplexing before the demultiplexed additional information is embedded, and the additional information together.

Moreover, the present invention is characterized in that the display means displays the additional information using the image which is to undergo multiplexing as a background image.

Figure 33:
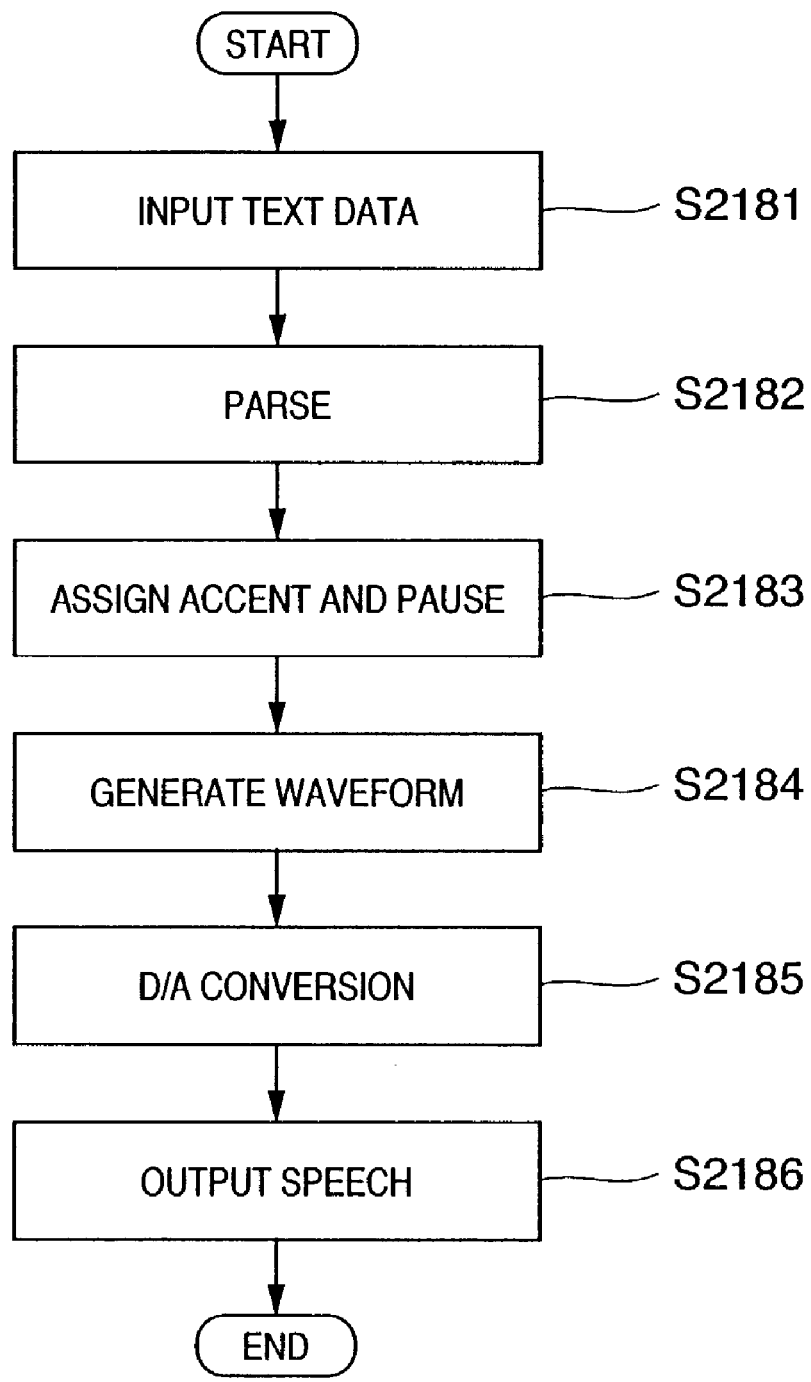
FIG. 33 is a flow chart for explaining the operation sequence of a speech synthesis processor 2176 in the fourth embodiment.

FIG. 33 is a flow chart for explaining the operation sequence of the speech synthesis processor 2176 according to the fourth embodiment. Text data input to the speech synthesis processor 2176 is input to the parser 2176a (step S2181). The parser 2176a parses the text data using the language dictionary 2176f pre-stored in the secondary storage device 2025 to detect boundaries of words, pronunciations of kanji characters, and the like (step S2182).

The parsed information is input to the accent/pause assigner 2176b, which determines utterance units, assigns appropriate pauses, and sets accents in the utterance units using an assignment rule 2176g (step S2183).

The accent/pause-assigned information is input to the waveform generator 2176d to synthesize a digital speech waveform. As the speech waveform synthesis method, any of various methods such as a record/edit synthesis method of synthesizing waveforms for respective phonemes stored in advance, a parameter edit synthesis method for analyzing a speech waveform on the basis of a speech generation model, storing PARCOR, LSP, and the like as linear predictive parameters, and synthesizing a waveform using these parameters, and the like may be used.

In the speech synthesis process of this embodiment, phoneme data or linear predictive parameters for six speakers are stored in the secondary storage device 2025 in correspondence with the types of speakers shown in FIG. 30. Using the speaker information 2176h contained in the header field decoded by the error correction decoder 2176, the data selector 2176c selects corresponding speaker data from the six different speaker data shown in FIG. 30. The selected speaker data is input to the waveform generator 2176d to generate a synthesized waveform (step S2184).

Digital speech waveform information output from the waveform generator 2176d is input to the D/A converter 2176e and is converted into an analog signal, which is output from the loudspeaker 2177 as speech (step S2186).

Figure 34:
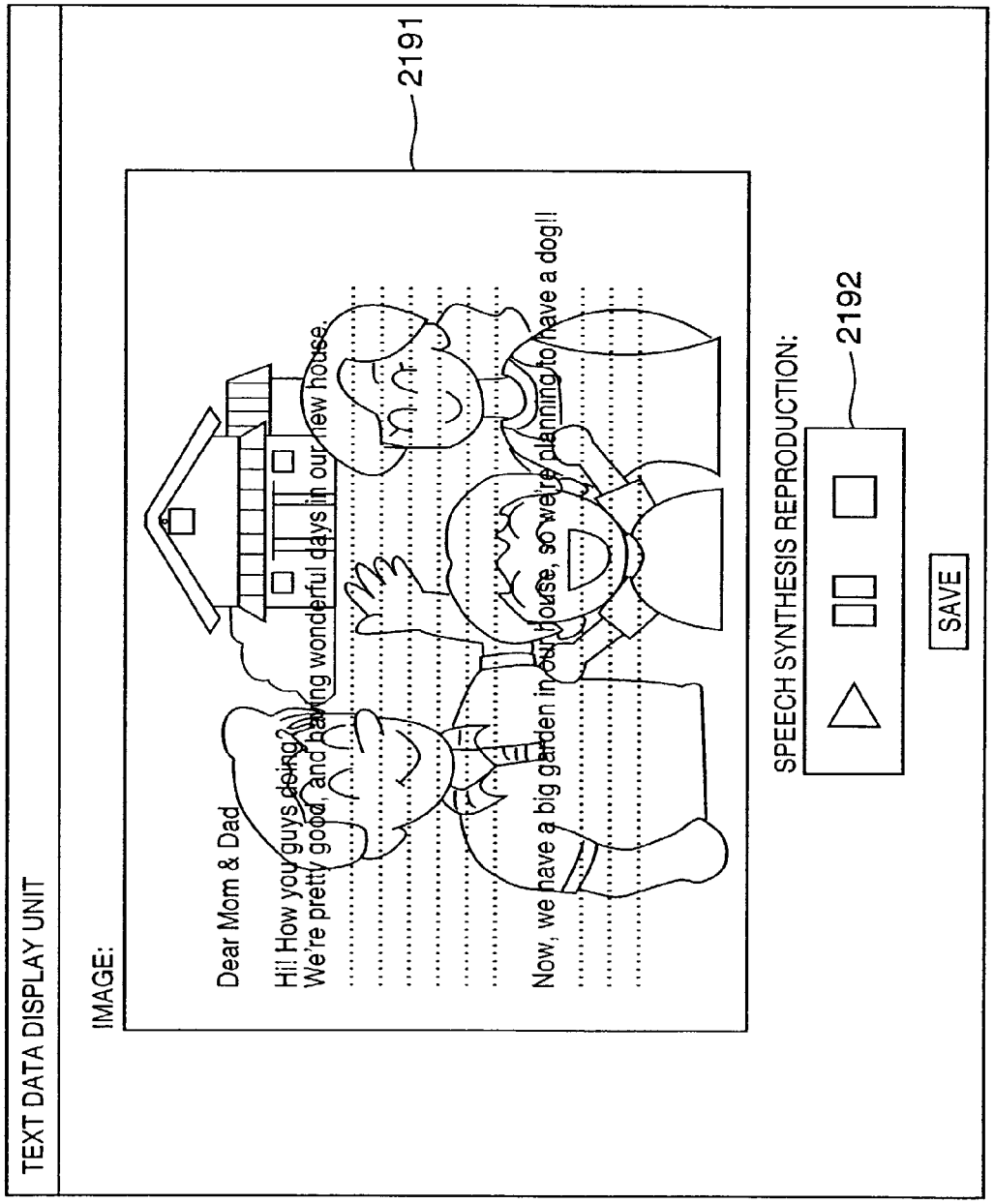
FIG. 34 shows an example of a GUI window used in the fourth embodiment.

FIG. 34 shows an example of a GUI window used in this embodiment. Referring to FIG. 34, an image area 2191 displays text data on the scanned image region where information is multiplexed as in the third embodiment. A GUI window has buttons 2192 used to reproduce and stop the generated synthesized speech. A viewer can control to reproduce, pause, and stop speech by operating the buttons 2192 using the mouse 2028.

With the process of this embodiment, text data which is invisibly multiplexed in an image which is to undergo multiplexing not only can be visibly displayed but also can be audibly recognized. Therefore, the above process can be applied to the field of social welfare. For example, a vision-impaired person cannot recognize the contents of a normal print if he or she receives it. However, by scanning the printed image using an optical scanner, the person can recognize the contents not only by vision but also by hearing.

Another Embodiment

Figure 35:
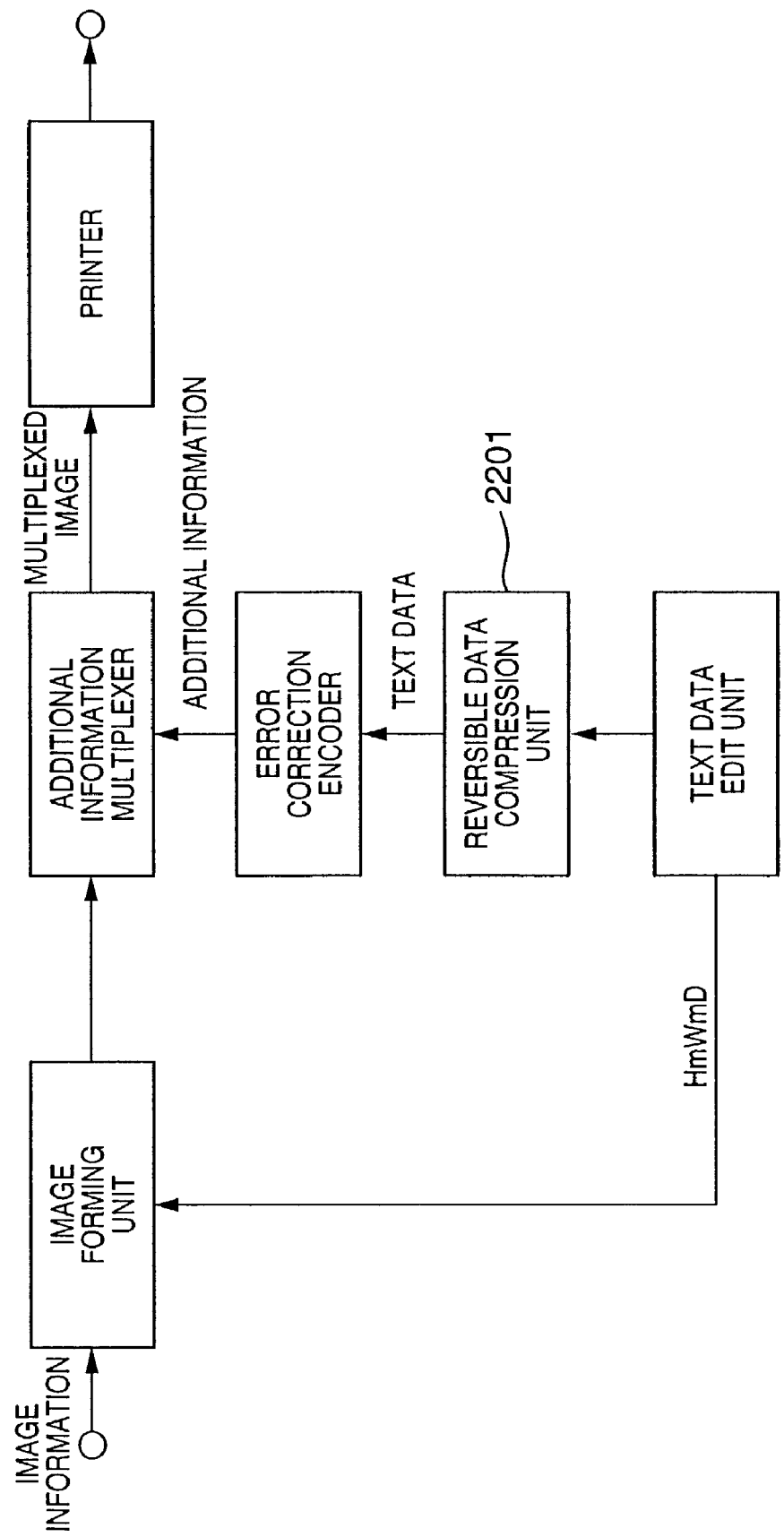
FIG. 35 is a block diagram showing the arrangement of an image processing apparatus for reversibly compressing edited text data, and multiplexing the compressed text data.
Figure 36:
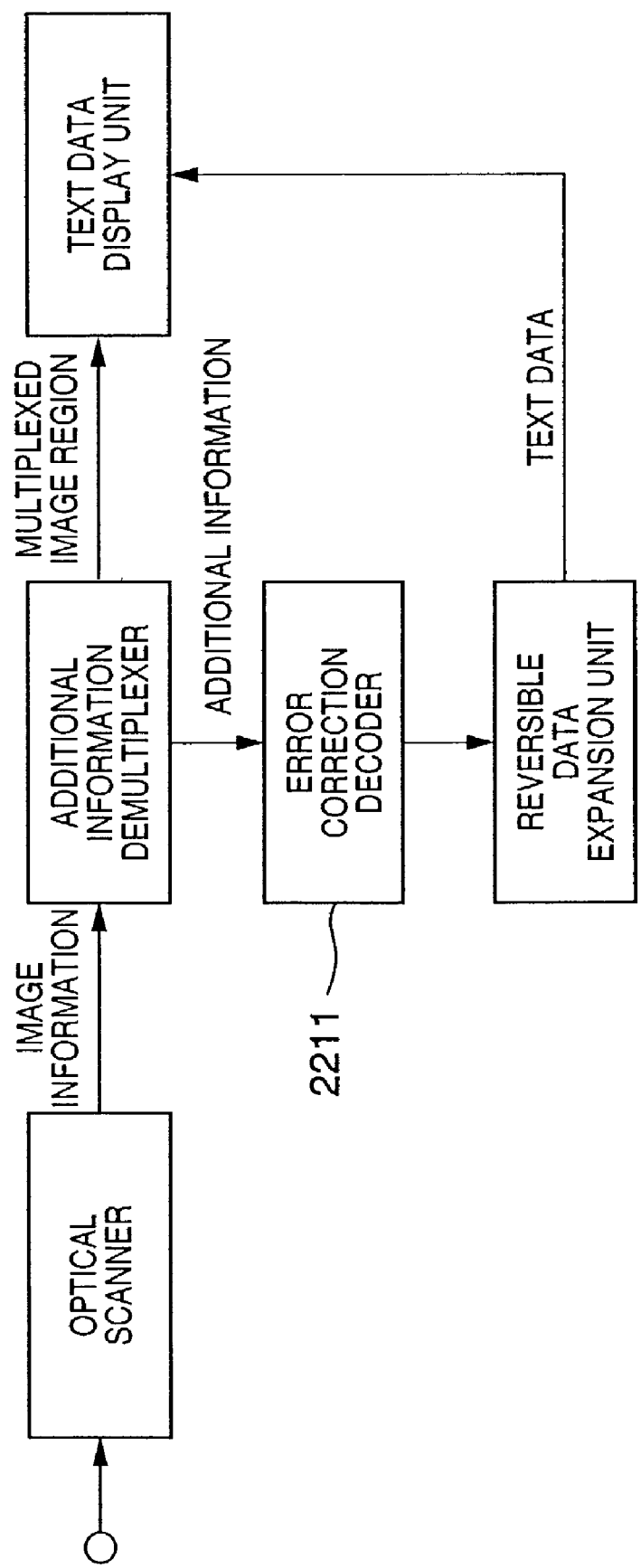
FIG. 36 is a block diagram showing the arrangement of an image processing apparatus for reversibly expanding demultiplexed additional information.
Figure 37:
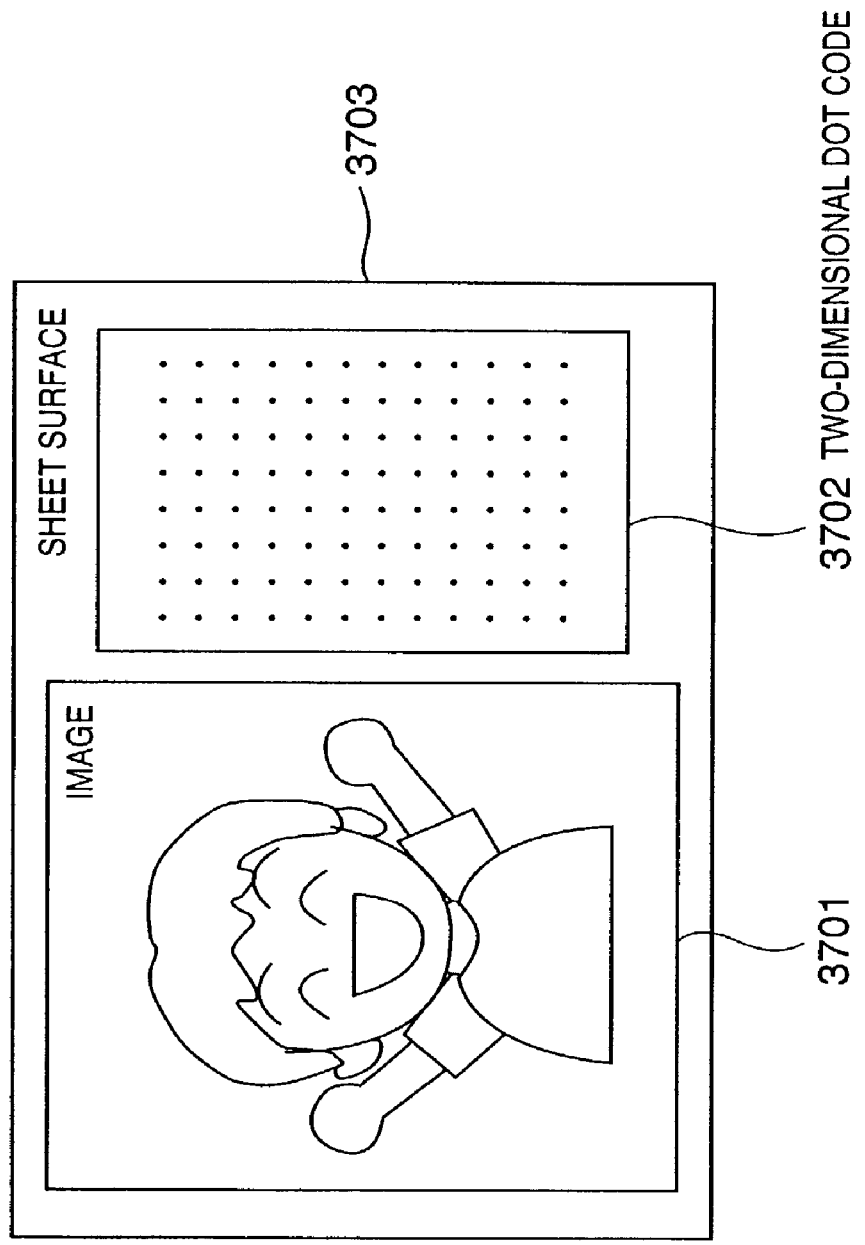
FIG. 37 is a view for explaining an image and additional information printed on a sheet surface using the prior art.

In the present invention, since text data is assumed as additional information, that data contains many redundancies. Hence, as shown in FIGS. 35 and 36, it is effective to add a reversible data compression unit 2201 to the print side, and a reversible data expansion unit 2211 to the decoding side. FIG. 35 is a block diagram showing the arrangement of an image processing apparatus for reversibly compressing edited text data, and multiplexing the compressed text data. FIG. 36 is a block diagram showing the arrangement of an image processing apparatus for reversibly expanding demultiplexed additional information. As the reversible data compression/expansion method, various methods such as an LZ77 (Lempel-Ziv) method, LZW method, runlength encoding method, and the like are available, and any of these methods can be used in the present invention.

That is, the present invention is characterized in that additional information appended with predetermined redundant bits for error correction by error correction encoding is embedded in the image, and the apparatus further comprises error correction decoding means (error correction decoder) for executing error correction decoding of the additional information demultiplexed by the demultiplexing means (additional information demultiplexer) using the redundant bits.

Also, the present invention is characterized in that additional information appended with predetermined redundant bits for error correction after reversible data compression is embedded in the image, and the apparatus further comprises expansion means (reversible data expansion means 2211) for executing a reversible data expansion process of the additional information after error correction decoding.

Furthermore, the present invention is characterized in that a BCH code is used in the error correction encoding and decoding processes.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the recording medium, that recording medium stores program codes corresponding to the aforementioned flow charts.

As described above, according to the present invention, upon restoring additional information such as large-size text information, audio information, and the like embedded in an image, the sense of identity with that image can be sufficiently given to the user.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for scanning a print on which a still image having additional information, representing a moving image is printed, and displaying an image in accordance with the scanned still image and additional information, comprising:
   demultiplexing means for demultiplexing the additional information in the still image information obtained by scanning;
   resizing means for resizing the additional information demultiplexed by said demultiplexing means into a display size; and
   reproduction means for reproducing the moving image in accordance with the additional information resized by said resizing means so as to superpose the moving image on the scanned still image, which is used as a background image of the moving image.

2. The apparatus according to claim 1, wherein said demultiplexing means demultiplexes from the scanned image additional information which is multiplexed on the image by digital watermarking.

3. The apparatus according to claim 2, wherein the additional information is embedded as code information by generating regularity in texture produced by error diffusion.

4. The apparatus according to claim 1, wherein said demultiplexing means demultiplexes additional information by decoding a scanned image corresponding to a region on a print where the additional information is encoded and recorded.

5. The apparatus according to claim 4, wherein the additional information is printed using a barcode or two dimensional dot code.

6. The apparatus according to claim 1, wherein a header of the additional information contains infoRMation indicating a display position and a position of a region.

7. The apparatus according to claim 6, wherein the position of the region is expressed by a ratio to a size of an image to be displayed, and when the size of the image is changed, the size of the moving image as the additional information is adjusted in correspondence with the changed size.

8. A method of controlling an image processing apparatus for scanning a print on which a still image having additional information representing a moving is printed, using a predetermined scanner, and displaying an image in accordance with the scanned still image and additional information, comprising:
   the demultiplexing step of demultiplexing the additional information in the still image information obtained by scanning;
   the resizing step of resizing the additional information demultiplexed in said demultiplexing step into a display size; and
   the reproduction step of reproducing the moving image in accordance with the additional information resized in said resizing step so as to superpose the moving image on the scanned still image, which is used as a background image of the moving image.

9. A computer-readable medium storing a computer program which serves as an image processing apparatus for scanning a print on which a still image having additional information representing a moving image is printed, using a predetermined scanner, and displaying an image in accordance with the scanned still image and additional information, said computer program comprising:
   a program code of a demultiplexing step of demultiplexing the additional information in the still image information obtained by scanning;
   a program code of a resizing step of resizing the additional information demultiplexed in said demultiplexing step into a display size; and
   a program code of a reproduction step of reproducing the moving image in accordance with the additional information resized in said resizing step so as to superpose the moving image on the scanned image, which is used as a background image of the moving image.

10. The apparatus according to claim 1, wherein the additional information is appended with predetermined redundant bits for error correction by error correction encoding and is embedded in the still image, and
   said apparatus further comprises error decoding means for executing error correction decoding of the additional information demultiplexed by said demultiplexing means using the redundant bits.

11. The apparatus according to claim 1, wherein the additional information is appended with predetermined redundant bits for error correction after reversible data compression and is embedded in the still image, and
   said apparatus further comprises expansion means for executing a reversible data expansion process of the additional information after error correction decoding.

12. The apparatus according to claim 1, wherein a BCH code is used in the error correction encoding and decoding processes.

* * * * *

UNITED STATES PATENT AND TRADEMARK OFFICE
CERTIFICATE OF CORRECTION

PATENT NO. : 7,253,917 B2 Page 1 of 1
APPLICATION NO. : 10/163616
DATED : August 7, 2007
INVENTOR(S) : Kiyoshi Umeda et al.

It is certified that error appears in the above-identified patent and that said Letters Patent is hereby corrected as shown below:

Col. 1, line 47, "sense" should read --a sense--.

Col. 12, line 37, "No. 2001-148778," should read --No. 2001-148778.--.

Col. 14, line 31, "embodiment" should read --embodiments--.

Col. 17, line 34, "information," should read --information--.

line 63, "two" should read --two- --.

line 66, "infoRMation" should read --information--.

Col. 18, line 9, "a moving" should read --a moving image--.

line 14, "the demultiplexing" should read --a demultiplexing--.

line 17, "the resizing" should read --a resizing--.

line 21, "the reproduction" should read --a reproduction--.

line 50, "error" should read --error correction--.

Signed and Sealed this

Third Day of June, 2008

JON W. DUDAS
*Director of the United States Patent and Trademark Office*